US007602555B2

(12) United States Patent
Kawasaki et al.

(10) Patent No.: US 7,602,555 B2
(45) Date of Patent: Oct. 13, 2009

(54) OBSERVATION OR MEASUREMENT MEANS AND OBSERVATION OR MEASUREMENT SYSTEM PROVIDED WITH THE SAME, FEEBLE LIGHT IMAGE PICKUP OPTICAL SYSTEM AND MICROSCOPE APPARATUS PROVIDED WITH THE SAME, MICROSCOPE SYSTEM PROVIDED WITH THE MICROSCOPE APPARATUS, AND OBSERVATION APPARATUS AND OBSERVATION SYSTEM PROVIDED WITH THE SAME

(75) Inventors: Kenji Kawasaki, Hachioji (JP); Atsushi Yonetani, Tama (JP)

(73) Assignee: Olympus Corporation, Tokyo (JP)

( * ) Notice: Subject to any disclaimer, the term of this patent is extended or adjusted under 35 U.S.C. 154(b) by 236 days.

(21) Appl. No.: 11/386,615

(22) Filed: Mar. 23, 2006

(65) Prior Publication Data
US 2006/0238858 A1 Oct. 26, 2006

(30) Foreign Application Priority Data
Mar. 24, 2005 (JP) ............................. 2005-086644
Jun. 28, 2005 (JP) ............................. 2005-188086

(51) Int. Cl.
*G02B 21/02* (2006.01)
(52) U.S. Cl. ...................................... 359/656; 359/368
(58) Field of Classification Search ......... 359/368–390, 359/642, 656–661
See application file for complete search history.

(56) References Cited

U.S. PATENT DOCUMENTS

| 5,394,271 | A | * | 2/1995 | Tanaka et al. | ............... | 359/656 |
| 6,128,128 | A | * | 10/2000 | Otaki et al. | ................ | 359/381 |
| 6,560,032 | B2 | * | 5/2003 | Hatano | ...................... | 359/656 |
| 6,674,574 | B1 | * | 1/2004 | Aono | ......................... | 359/383 |
| 6,754,008 | B1 | | 6/2004 | Wallerstein et al. | | |

FOREIGN PATENT DOCUMENTS

| JP | 01-045020 | 10/1989 |
| JP | 05-113540 | 5/1993 |
| JP | 10-031162 | 2/1998 |
| JP | 11-231224 | 8/1999 |
| JP | 2001-021812 | 1/2001 |

* cited by examiner

*Primary Examiner*—Thong Nguyen
(74) *Attorney, Agent, or Firm*—Kenyon & Kenyon LLP

(57) ABSTRACT

An observation or measurement device has, at least, an infinity-corrected objective lens and an imaging lens, and satisfies a condition, $4.56 \leq D \cdot NA' \leq 30$ (mm), where D is the parfocal distance of the objective lens and NA' is the numerical aperture of the imaging lens. It is desirable to make a distance from the mount position of the objective lens to the most object-side surface of the imaging lens variable and to satisfy a condition, $0.5 \, FL < W < 1.2 \, FL$ (mm), where W is the variable amount of the distance from the mount position of the objective lens to the most object-side surface of the imaging lens, and FL is the focal length of the imaging lens. It is more desirable to satisfy conditions, $0.4 < D/FL < 5$ and $1 \leq D/\phi d < 3$, where $\phi d$ is the outside diameter of a connection at the mount of the objective lens.

63 Claims, 6 Drawing Sheets

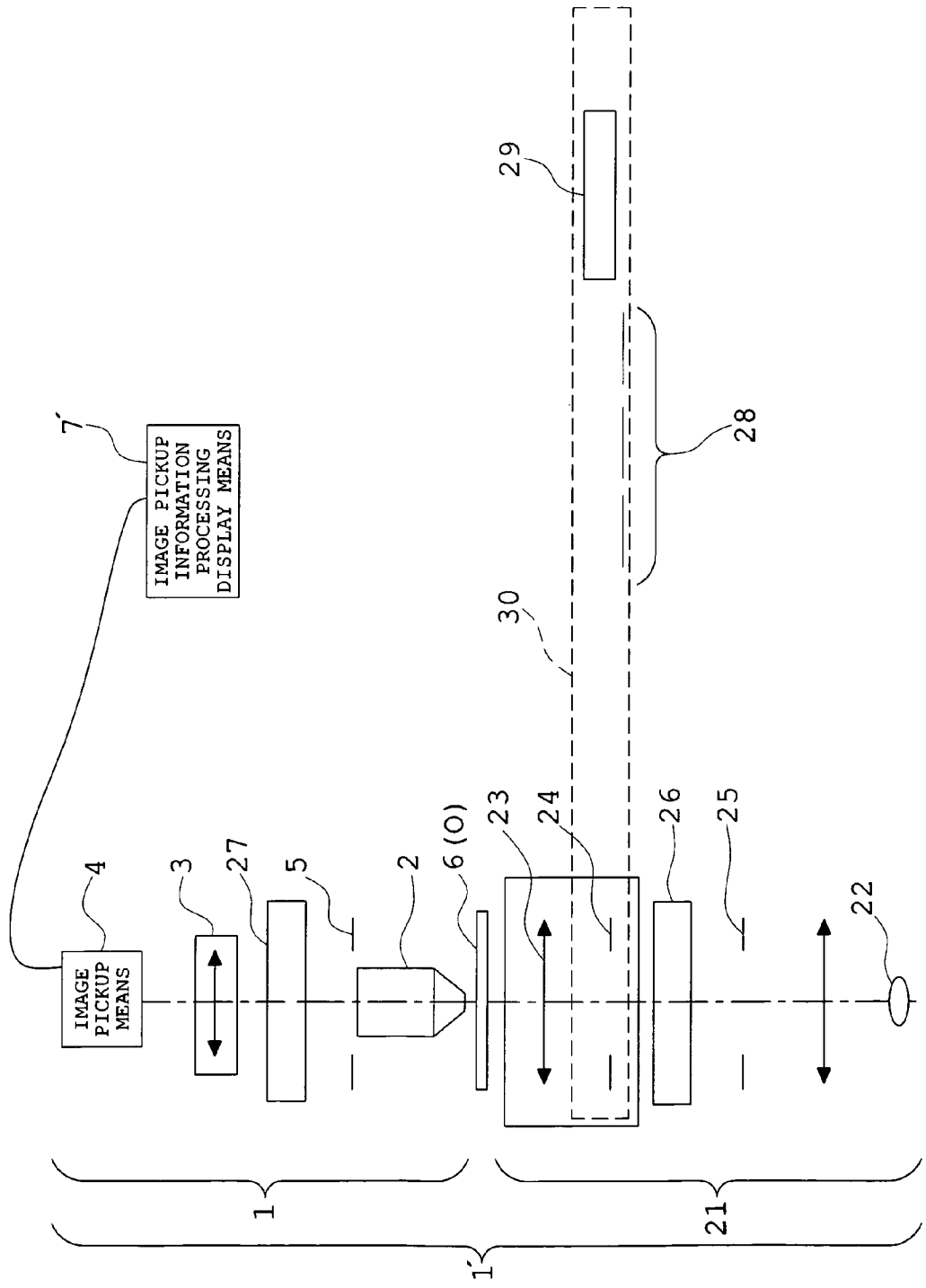

OBSERVATION OR MEASUREMENT MEANS AND OBSERVATION OR MEASUREMENT SYSTEM PROVIDED WITH THE SAME, FEEBLE LIGHT IMAGE PICKUP OPTICAL SYSTEM AND MICROSCOPE APPARATUS PROVIDED WITH THE SAME, MICROSCOPE SYSTEM PROVIDED WITH THE MICROSCOPE APPARATUS, AND OBSERVATION APPARATUS AND OBSERVATION SYSTEM PROVIDED WITH THE SAME

This application claims benefits of Japanese Application No. 2005-086644 filed in Japan on Mar. 24, 2005 and No. 2005-188086 filed in Japan on Jun. 28, 2005, the contents of which are hereby incorporated by reference.

BACKGROUND OF THE INVENTION

1. Field of the Invention

This invention relates to an observation or measurement means and an observation or measurement system provided with this means, and more specifically, to a feeble light image pickup optical system capable of detecting feeble light from an object, such as radiation from a living body, and an microscope apparatus provided with this optical system, a microscope system provided with the microscope apparatus, and an observation apparatus capable of observing the interior of a living cell and an observation system provided with this observation apparatus.

2. Description of Related Art

In the most advanced research field at present, various methods of observing cells, in vivo, for a long period of time (several days to several weeks) are developed for purposes of the functional clarification of living cells and the behavior analysis and interaction clarification of a protein. As one technique of observation by an observation apparatus such as a microscope for observing a lesion part inside a living cell, the method of a fluorescence observation is largely used. The fluorescence observation is such that, after a particular fluorescent substance like a fluorescent protein is used as a light-emitting label to stain a living specimen like the living cell, fluorescent light is produced by irradiating the specimen with exciting light and is observed to thereby detect the existence of a particular part in the living specimen, such as the lesion part inside the living cell, and its position.

In conventional practice, observation apparatuses for observing living cells, including fluorescence observations, and optical systems used in the observation apparatuses are set forth, for example, in Japanese Patent Kokai Nos. Hei 5-113540, Hei 10-31162, Hei 11-231224, and 2001-21812.

The fluorescence observation, however, has problems described below.

In order to produce fluorescent light, it is necessary to increase the intensity of exciting light, to some degree, with which the living cell is irradiated. However, if the irradiation of high-intensity exciting light is continued, the living cell will suffer serious damage. In the fluorescence observation, therefore, it is difficult to observe the living cell in a stabilized condition for a long time. Since the living specimen is irradiated with the exciting light in the fluorescence observation, the background other than the fluorescence is increased and is liable to adversely affect an S/N ratio. As such, in the fluorescence observation, the quantification of fluorescence measurement becomes a problem. Furthermore, in the fluorescence observation, the fluorescent substance and the apparatus for carrying out the fluorescence observation are expensive and bring about high costs.

In recent years, however, it has been required to detect radiation from the living cell without irradiating the living cell with the exciting light and thereby to detect the existence of a particular part, such as the lesion part, inside the living cell, and its position.

In a method of detection with light emission, for example, a particular part or a functional protein in the living cell is labeled by a particular auto-luminous enzyme like a luciferase gene that is a bioluminescence enzyme, and its radiation is detected.

According to the method of detection with light emission, the irradiation of the living cell with the exciting light that formerly has been required for the fluorescence observation becomes unnecessary, and thus the fluorescence observation can be made in a stable condition for a long period of time without causing damage to the living cell. Moreover, it is possible to make measurements that the background becomes low, the S/N ratio is high, and the quantification is excellent.

On the other hand, in the method of detection with light emission, radiation from the luminous enzyme like the luciferase gene is low in intensity and faint, and hence there is the disadvantage that faint light must be detected.

Conventional optical apparatuses for detecting faint radiation are described, for example, in U.S. Pat. No. 6,754,008 B1 and Japanese Patent Publication No. Hei 1-45020.

In the fluorescence observation, as mentioned above, when the living specimen receives some stimulation in such a way that it is irradiated with the exciting light, there is the possibility that the stimulation itself adversely affects an active condition of the cell. Consequently, the observation system requires that a luminous label is stimulated by the lowest possible stimulation (low-intensity exciting light) so that a weak luminous signal produced in accordance with this stimulation can be detected at extremely high efficiency.

At the same time, the observation system also requires that provision is made so as not to lose a state of movement of the living cell and at the same time, information from many cells are detected at a time by observations in a wide range and a processing speed and work efficiency can be improved.

The observation system further requires having flexible extensiveness allowing a combination with another observation method and the interchangeability with a conventional observation system.

However, in the fields of the above conventional observation apparatuses set forth in Kokai Nos. Hei 5-113540, Hei 10-31162, Hei 11-231224, and 2001-21812, observation apparatuses and observation systems satisfying these requirements do not exist.

In the optical apparatus for detecting faint radiation, the above apparatus set forth in U.S. Pat. No. 6,754,008 B1 is such that its optical system is constructed as a demagnifying system. With the apparatus described here, therefore, faint radiation emanating from the particular part of the living cell cannot be detected.

The above apparatus set forth in Japanese Patent Publication No. Hei 1-45020 is provided for the purpose of measuring an aging expression level in the cell by using the luminous enzyme like the luciferase gene. In this apparatus, however, the average value of the entire cell on the analysis of the expression level is measured and the expression level of each cell cannot be obtained.

In order to use a conventional microscope to detect faint radiation, a costly photon counting system is required.

SUMMARY OF THE INVENTION

The observation or measurement means according to the present invention comprises, at least, an infinity-corrected objective lens and an imaging lens and satisfies the following condition:

$$4.56 \leq D \cdot NA' \leq 30 \text{ (mm)} \quad (1)$$

where D is the parfocal distance of the objective lens and NA' is the numerical aperture of the imaging lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions:

$$4.56 \leq D \cdot NA' \leq 30 \text{ (mm)} \quad (1)$$

$$0.5 FL < W < 1.2 FL \text{ (mm)} \quad (2)$$

where D is the parfocal distance of the objective lens, NA' is the numerical aperture of the imaging lens, W is the variable amount of the distance from the mount position of the objective lens to the most object-side surface of the imaging lens, and FL is the focal length of the imaging lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions:

$$4.56 \leq D \cdot NA' \leq 30 \text{ (mm)} \quad (1)$$

$$0.5 FL < W < 1.2 FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, and the back focus position of the objective lens is located on the object side of the mount position of the objective lens:

$$4.56 \leq D \cdot NA' \leq 30 \text{ (mm)} \quad (1)$$

$$0.5 FL < W < 1.2 FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, the back focus position of the objective lens is located on the object side of the mount position of the objective lens, and at least two interchangeable objective lenses including the objective lens are provided and constructed so that tolerances of the distance between the mount position and the back focus position are within ±15 mm in each of the interchangeable objective lenses:

$$4.56 \leq D \cdot NA' \leq 30 \text{ (mm)} \quad (1)$$

$$0.5 FL < W < 1.2 FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions and is provided with at least two interchangeable objective lenses of different parfocal distances, including the objective lens, and a mount-position adjusting means for changing the mount position of each of the interchangeable objective lenses in accordance with the parfocal distance of each objective lens so that even when either objective lens of different parfocal distance is interchanged, the front focus position of the objective lens interchanged and mounted practically coincides with that of the other objective lens:

$$4.56 \leq D \cdot NA' \leq 30 \text{ (mm)} \quad (1)$$

$$0.5 FL < W < 1.2 FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions and further comprises at least two imaging lenses including the imaging lens:

$$4.56 \leq D \cdot NA' \leq 30 \text{ (mm)} \quad (1)$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, and further comprises an illumination optical system for fluorescence observations interposed between the objective lens and the imaging lens:

$$4.56 \leq D \cdot NA' \leq 30 \text{ (mm)} \quad (1)$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and an illumination optical system for fluorescence observations is interposed between the objective lens and the imaging lens:

$$4.56 \leq D \cdot NA' \leq 30 \text{ (mm)} \quad (1)$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, the back focus position of the objective lens is located on the object side of the mount position of the objective lens, and the objective lens is a liquid immersion objective lens or a solid immersion objective lens:

$$4.56 \leq D \cdot NA' \leq 30 \text{ (mm)} \quad (1)$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and each of the objective lenses is a liquid immersion objective lens or a solid immersion objective lens:

$$4.56 \leq D \cdot NA' \leq 30 \text{ (mm)} \quad (1)$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation or measurement system according to the present invention comprises the observation or measurement means of the present invention in any aspect described above and an image pickup means picking up an image of an object from the observation or measurement means.

The observation or measurement system according to the present invention comprises the observation or measurement means of the present invention in any aspect described above and an image pickup means picking up an image of an object from the observation or measurement means, and when the observation or measurement means of the present invention in any aspect described above is taken as a first observation or measurement means and an observation or measurement means having a second infinity-corrected objective lens of different parfocal distance and emergence NA from the objective lens used in the first observation or measurement means and a second imaging lens of the same focal length as the imaging lens used in the first observation or measurement means is taken as a second observation or measurement means, the objective lens and the imaging lens in the first observation or measurement means satisfy the following conditions with respect to the second objective lens and the second imaging lens in the second observation or measurement means:

$$0.1 \leq NA2'/NA' \leq 0.88 \quad (5)$$

$$0.5 \leq D2/D \leq 0.87 \quad (6)$$

$$-15 < fb2 - fb < 15 \text{ (mm)} \quad (7)$$

where NA' is the numerical aperture of the imaging lens in the first observation or measurement means, D is the parfocal distance of the objective lens, fb is a distance, measured along the optical axis, from the surface of the object to the back focus position of the objective lens, NA2' is the numerical aperture of the second imaging lens in the second observation or measurement means, D2 is the parfocal distance of the second objective lens, and fb2 is a distance, measured along the optical axis, from the surface of the object to the back focus position of the second objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them:

$$4.56 \leq D \cdot NA' \leq 30 \text{ (mm)} \quad (1)$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them.

$$4.56 \leq D \cdot NA' \leq 30 \text{ (mm)} \quad (1)$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens:

$$4.56 \leq D \cdot NA' \leq 30 \text{ (mm)} \quad (1)$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation or measurement means according to the present invention comprises, at least, an infinity-corrected objective lens and an imaging lens, and a distance from the mount position of the objective lens to the most object-side surface of the imaging lens is variable. The observation or measurement means satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens.

$$4.56 \leq D \cdot NA' \leq 30 \text{ (mm)} \quad (1)$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation or measurement system according to the present invention comprises the observation or measurement means of the present invention in any aspect, provided with the transmission illumination optical system, an image pickup means picking up an image of an object from the observation or measurement means, and an image processing means for superimposing a transmission illumination observation image of the object obtained through the image pickup means on a radiation observation image from the object.

The observation or measurement system according to the present invention comprises the observation or measurement means of the present invention in any aspect, provided with the transmission illumination optical system, an image pickup means picking up an image of an object from the observation or measurement means, and an image processing means for superimposing a transmission illumination observation image of the object obtained through the image pickup means on a radiation observation image from the object, and further comprises a display means for displaying image areas superimposed through the image processing means on a display device, together with the superimposed images.

The feeble light image pickup optical system according to the present invention comprises an infinity-corrected objective lens, an imaging lens, and an image pickup means. In this case, feeble light from the object can be detected and the feeble light image pickup optical system satisfies the following condition:

$$5 \leq D \cdot NA' \leq 30 \text{ (mm)} \quad (1')$$

where D is the parfocal distance of the objective lens and NA' is the numerical aperture of the imaging lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, and the feeble light image pickup optical system satisfies the following conditions:

$$5 \leq D \cdot NA' \leq 30 \text{ (mm)} \quad (1')$$

$$0.5FL < W < 1.2FL \text{ (mm)} \quad (2)$$

where D is the parfocal distance of the objective lens, NA' is the numerical aperture of the imaging lens, W is the variable amount of the distance from the mount position of the objective lens to the most object-side surface of the imaging lens, and FL is the focal length of the imaging lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, and the feeble light image pickup optical system satisfies the following conditions:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, and the back focus position of the objective lens is located on the object side of the mount position of the objective lens:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position of the objective lens is located on the object side of the mount position of the objective lens, and at least two interchangeable objective lenses including the objective lens are provided and constructed so that tolerances of the distance between the mount position and the back focus position are within ±15 mm in each of the interchangeable objective lenses:

$$5 \leq D \cdot NA' \leq 30 \text{ (mm)} \qquad (1')$$

$$0.5FL < W < 1.2FL \text{ (mm)} \qquad (2)$$

$$0.4 < D/FL < 5 \qquad (3)$$

$$1 \leq D/\phi d < 3 \qquad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, and the feeble light image pickup optical system satisfies the following conditions and has at least two interchangeable objective lenses including the objective lens, provided so that their parfocal distances are different and a mount-position adjusting means for changing the mount position of each of the interchangeable objective lenses in accordance with the parfocal distance of each objective lens so that even when either objective lens of different parfocal distance is interchanged, the front focus position of the objective lens interchanged and mounted practically coincides with that of the other objective lens:

$$5 \leq D \cdot NA' \leq 30 \text{ (mm)} \qquad (1')$$

$$0.5FL < W < 1.2FL \text{ (mm)} \qquad (2)$$

$$0.4 < D/FL < 5 \qquad (3)$$

$$1 \leq D/\phi d < 3 \qquad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, and the feeble light image pickup optical system satisfies the following conditions and further comprises at least two imaging lenses including the imaging lens:

$$5 \leq D \cdot NA' \leq 30 \text{ (mm)} \qquad (1')$$

$$0.5FL < W < 1.2FL \text{ (mm)} \qquad (2)$$

$$0.4 < D/FL < 5 \qquad (3)$$

$$1 \leq D/\phi d < 3 \qquad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, and the feeble light image pickup optical system satisfies the following conditions and further comprises an illumination optical system for fluorescence observations interposed between the objective lens and the imaging lens:

$$5 \leq D \cdot NA' \leq 30 \text{ (mm)} \qquad (1')$$

$$0.5FL < W < 1.2FL \text{ (mm)} \qquad (2)$$

$$0.4 < D/FL < 5 \qquad (3)$$

$$1 \leq D/\phi d < 3 \qquad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and an illumination optical system for fluorescence observations is interposed between the objective lens and the imaging lens:

$$5 \leq D \cdot NA' \leq 30 \text{ (mm)} \qquad (1')$$

$$0.5FL < W < 1.2FL \text{ (mm)} \qquad (2)$$

$$0.4 < D/FL < 5 \qquad (3)$$

$$1 \leq D/\phi d < 3 \qquad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position of the objective lens is located on the object side of the mount position of the objective lens, and the objective lens is a liquid immersion objective lens or a solid immersion objective lens:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and each of the objective lenses is a liquid immersion objective lens or a solid immersion objective lens:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The microscope apparatus according to the present invention comprises the feeble light image pickup optical system of the present invention in any aspect described above.

The microscope system according to the present invention comprises the microscope apparatus provided with the feeble light image pickup optical system in any aspect described above and when the microscope apparatus provided with the feeble light image pickup optical system in any aspect described above is taken as a first microscope apparatus and a microscope apparatus having a second infinity-corrected objective lens of different parfocal distance and emergence NA from the objective lens used in the first microscope apparatus and a second imaging lens identical in focal length with the imaging lens used in the first microscope apparatus is taken as a second microscope apparatus, the objective lens and the imaging lens in the first microscope apparatus satisfy the following conditions with respect to the second objective lens and the second imaging lens in the second microscope apparatus:

$$0.1 \leq NA2'/NA' \leq 0.88 \quad (5)$$

$$0.5 \leq D2/D \leq 0.87 \quad (6)$$

$$-15 < fb2 - fb < 15 \text{ (mm)} \quad (7)$$

where NA' is the numerical aperture of the imaging lens in the first microscope apparatus, D is the parfocal distance of the objective lens, fb is a distance, measured along the optical axis, from the surface of the object to the back focus position of the objective lens, NA2' is the numerical aperture of the second imaging lens in the second microscope apparatus, D2 is the parfocal distance of the second objective lens, and fb2 is a distance, measured along the optical axis, from the surface of the object to the back focus position of the second objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position is located on the object side of the mount position of the objective lens, at least two interchangeable objective lenses are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens:

$$5 \leq D \cdot NA' \leq 30 \text{ (mm)} \tag{1'}$$

$$0.5FL < W < 1.2FL \text{ (mm)} \tag{2}$$

$$0.4 < D/FL < 5 \tag{3}$$

$$1 \leq D/\phi d < 3 \tag{4}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens:

$$5 \leq D \cdot NA' \leq 30 \text{ (mm)} \tag{1'}$$

$$0.5FL < W < 1.2FL \text{ (mm)} \tag{2}$$

$$0.4 < D/FL < 5 \tag{3}$$

$$1 \leq D/\phi d < 3 \tag{4}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and an image processing means for superimposing a transmission illumination observation image of the object obtained through the image pickup means on a radiation observation image from the object is provided:

$$5 \leq D \cdot NA' \leq 30 \text{ (mm)} \tag{1'}$$

$$0.5FL < W < 1.2FL \text{ (mm)} \tag{2}$$

$$0.4 < D/FL < 5 \tag{3}$$

$$1 \leq D/\phi d < 3 \tag{4}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and an image processing means for superimposing a transmission illumination observation image of the object obtained through the image pickup means on a radiation observation image from the object is provided:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object, a distance from the mount position of the objective lens to the most object-side surface of the imaging lens is variable, the feeble light image pickup optical system satisfies the following conditions, a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens, and an image processing means for superimposing a transmission illumination observation image of the object obtained through the image pickup means on a radiation observation image from the object is provided:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens, and an image processing means for superimposing a transmission illumination observation image of the object obtained through the image pickup means on a radiation observation image from the object is provided:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, an image processing means for superimposing a transmission illumination observation image of the object obtained through the image pickup means on a radiation observation image from the object is provided, and a display means for displaying image areas superimposed through the image processing means on a display device, together with the superimposed images, is further provided:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, an image processing means for superimposing a transmission illumination observation image of the object obtained through the image pickup means on a radiation observation image from the object is provided, and a display means for displaying image areas superimposed through the image processing means on a display device, together with the superimposed images, is further provided:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and ϕd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens, an image processing means for superimposing a transmission illumination observation image of the object obtained through the image pickup means on a radiation observation image from the object is provided, and a display means for displaying image areas superimposed through the image processing means on a display device, together with the superimposed images, is further provided:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and ϕd is the outside diameter of a connection at the mount of the objective lens.

The feeble light image pickup optical system according to the present invention comprises an infinity-corrected objective lens, an imaging lens, and an image pickup means. In this case, feeble light from the object can be detected, a distance from the mount position of the objective lens to the most object-side surface of the imaging lens is variable, the feeble light image pickup optical system satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens, an image processing means for superimposing a transmission illumination observation image of the object obtained through the image pickup means on a radiation observation image from the object is provided, and a display means for displaying image areas superimposed through the image processing means on a display device, together with the superimposed images, is further provided:

$$5 \leq D \cdot NA' \leq 30 \text{ (mm)} \quad (1')$$

$$0.5FL < W < 1.2FL \text{ (mm)} \quad (2)$$

$$0.4 < D/FL < 5 \quad (3)$$

$$1 \leq D/\phi d < 3 \quad (4)$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and ϕd is the outside diameter of a connection at the mount of the objective lens.

The observation apparatus according to the present invention comprises an infinity-corrected objective lens and an imaging lens, and satisfies the following condition:

$$4.56 \leq D \cdot NA' < 10 \text{ (mm)} \quad (1'')$$

where D is the parfocal distance of the objective lens and NA' is the numerical aperture of the imaging lens.

The observation apparatus according to the present invention comprises an infinity-corrected objective lens and an imaging lens. In this case, a distance from the mount position of the objective lens to the most object-side surface of the imaging lens is variable, and the observation apparatus satisfies the following conditions:

$$4.56 \leq D \cdot NA' < 10 \text{ (mm)} \tag{1''}$$

$$0.5FL < W < 1.2FL \text{ (mm)} \tag{2}$$

where D is the parfocal distance of the objective lens, NA' is the numerical aperture of the imaging lens, W is the variable amount of the distance from the mount position of the objective lens to the most object-side surface of the imaging lens, and FL is the focal length of the imaging lens.

The observation apparatus according to the present invention comprises an infinity-corrected objective lens and an imaging lens. In this case, a distance from the mount position of the objective lens to the most object-side surface of the imaging lens is variable, and the observation apparatus satisfies the following conditions:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, the observation apparatus satisfies the following conditions, and the back focus position of the objective lens is located on the object side of the mount position of the objective lens:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, the observation apparatus satisfies the following conditions, the back focus position of the objective lens is located on the object side of the mount position of the objective lens, and at least two interchangeable objective lenses including the objective lens are provided and constructed so that tolerances of the distance between the mount position and the back focus position are within ±15 mm in each of the interchangeable objective lenses:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, and the observation apparatus satisfies the following conditions and is provided with at least two interchangeable objective lenses of different parfocal distances, including the objective lens, a mount-position adjusting means for changing the mount position of each of the interchangeable objective lenses in accordance with the parfocal distance of each objective lens so that even when either objective lens of different parfocal distance is interchanged, the front focus position of the objective lens interchanged and mounted practically coincides with that of the other objective lens:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, and the observation apparatus satisfies the following conditions and further comprises at least two imaging lenses including the imaging lens:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, and the observation apparatus satisfies the following conditions and further comprises an illumination optical system for fluorescence observations interposed between the objective lens and the imaging lens:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, the observation apparatus satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and an illumination optical system for fluorescence observations is interposed between the objective lens and the imaging lens:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, the observation apparatus satisfies the following conditions, the back focus position of the objective lens is located on the object side of the mount position of the objective lens, and the objective lens is a liquid immersion objective lens or a solid immersion objective lens:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, the observation apparatus satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and each of the objective lenses is a liquid immersion objective lens or a solid immersion objective lens:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and φd is the outside diameter of a connection at the mount of the objective lens.

The observation system according to the present invention comprises the observation apparatus of the present invention in any aspect described above and an image pickup means picking up an image of an object from the observation apparatus.

The observation system according to the present invention comprises the observation apparatus of the present invention in any aspect described above and an image pickup means picking up an image of an object from the observation apparatus, and when the observation apparatus of the present invention in any aspect described above is taken as a first observation apparatus and an observation apparatus having a second infinity-corrected objective lens of different parfocal distance and emergence numerical aperture from the objective lens used in the first observation apparatus and a second imaging lens of the same focal length as the imaging lens used in the first observation apparatus is taken as a second observation apparatus, the objective lens and the imaging lens in the first observation apparatus satisfy the following conditions with respect to the second objective lens and the second imaging lens in the second observation apparatus:

$$0.3 \leq NA2'/NA' \leq 0.88 \tag{5'}$$

$$0.5 \leq D2/D \leq 0.87 \tag{6}$$

$$-15 < fb2 - fb < 15 \text{ (mm)} \tag{7}$$

where NA' is the numerical aperture of the imaging lens in the first observation apparatus, D is the parfocal distance of the objective lens, fb is a distance, measured along the optical axis, from the surface of the object to the back focus position of the objective lens, NA2' is the numerical aperture of the second imaging lens in the second observation apparatus, D2 is the parfocal distance of the second objective lens, and fb2 is a distance, measured along the optical axis, from the surface of the object to the back focus position of the second objective lens.

The observation apparatus according to the present invention comprises an infinity-corrected objective lens and an imaging lens. In this case, a distance from the mount position of the objective lens to the most object-side surface of the imaging lens is variable, the observation apparatus satisfies the following conditions, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, the observation apparatus satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, the observation apparatus satisfies the following conditions, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation apparatus according to the present invention comprises an infinity-corrected objective lens and an imaging lens. In this case, a distance from the mount position of the objective lens to the most object-side surface of the imaging lens is variable, the observation apparatus satisfies the following conditions, the back focus position of the objective lens is located on the object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on the opposite side of the objective lens, with the object between them, and has a light source and a condenser lens so that at least one of various optical elements capable of making the bright-field observation, the fluorescence observation, the phase-contrast observation, the differential interference contrast observation, and the Hoffman modulation contrast observation can be switched at about the pupil position of the condenser lens:

$$4.56 \leq D \cdot NA' < 10 \text{ (mm)} \tag{1''}$$

$$0.5FL < W < 1.2FL \text{ (mm)} \tag{2}$$

$$0.4 < D/FL < 1.2 \tag{3'}$$

$$1 < D/\phi d < 2.75 \tag{4'}$$

where D is the parfocal distance of the objective lens, NA' is the numerical aperture of the imaging lens, W is the variable amount of the distance from the mount position of the objective lens to the most object-side surface of the imaging lens, FL is the focal length of the imaging lens, and $\phi d$ is the outside diameter of a connection at the mount of the objective lens.

The observation system according to the present invention comprises the observation apparatus of the present invention in any aspect described above, an image pickup means picking up an image of an object from the observation apparatus, and an image processing means for superimposing a transmission illumination observation image of the object obtained through the image pickup means on a radiation observation image from the object.

The observation system according to the present invention comprises the observation apparatus of the present invention in any aspect described above, an image pickup means picking up an image of an object from the observation apparatus, an image processing means for superimposing a transmission illumination observation image of the object obtained through the image pickup means on a radiation observation image from the object, and a display means for displaying image areas superimposed through the image processing means on a display device, together with the superimposed images.

According to the observation or measurement means and the observation or measurement system provided with this means, the observation apparatus and the observation system provided with this apparatus, the feeble light image pickup optical system and the microscope apparatus provided with this optical system, and the microscope system provided with the microscope apparatus in the present invention, it is possible to obtain the observation or measurement means having high extensiveness which is capable of providing a high NA while having a wide field range to transmit a feeble light signal at a high S/N ratio and the observation or measurement system provided with this means, and more specifically, the observation apparatus and the observation system provided with this apparatus, the feeble light image pickup optical system capable of detecting feeble light emanating from a particular part of the living cell and the microscope apparatus provided with this optical system, and the microscope system provided with the microscope apparatus.

These and other features and advantages of the present invention will become apparent from the following detailed description of the preferred embodiments when taken in conjunction with the accompanying drawings.

BRIEF DESCRIPTION OF THE DRAWINGS

FIG. 9 is a block diagram showing a schematic structure of the whole of the microscope apparatus provided with the feeble light image pickup optical system (or the observation system provided with the observation apparatus) as the observation or measurement system provided with the observation or measurement means in an eighth embodiment of the present invention.

DETAILED DESCRIPTION OF THE PREFERRED EMBODIMENTS

Figure 1:
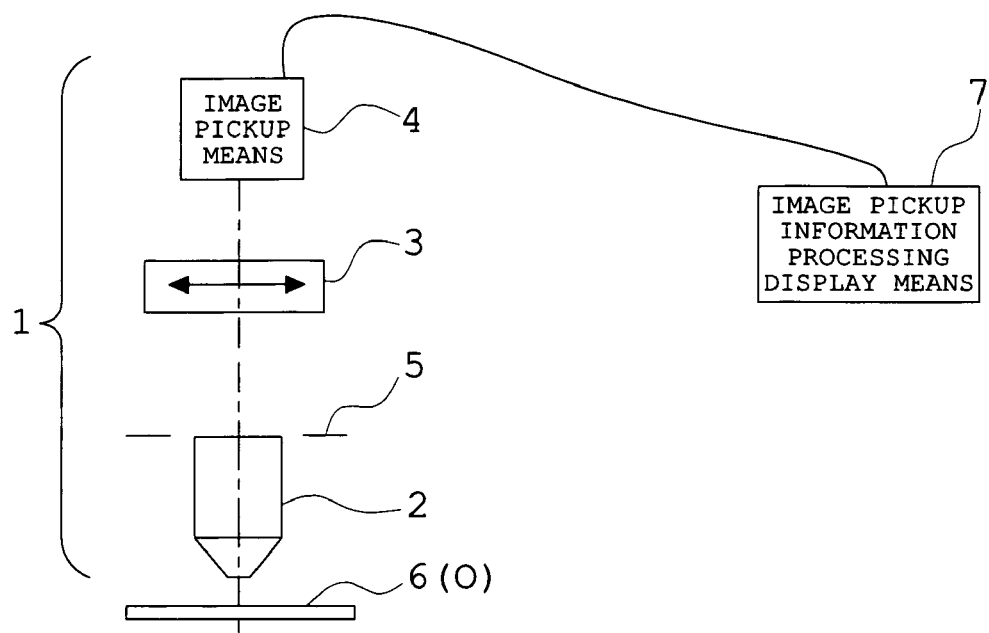
FIG. 1 is a block diagram showing a schematic structure of the whole of the microscope apparatus provided with the feeble light image pickup optical system (or the observation system provided with the observation apparatus) as the observation or measurement system provided with the observation or measurement means in a first embodiment of the present invention.

In the process of the consideration of the feeble light image pickup optical system capable of detecting feeble light emanating from a particular part of the living cell, the microscope apparatus provided with this optical system, and the microscope system provided with the microscope apparatus, the inventors of the present application have examined the possibility of observations on light emanating from the living cell into which the luciferase gene is introduced, changing the conditions of the imaging lens constituting the image pickup optical system used in a common, conventional fluorescence microscope. In the image pickup optical system of the conventional microscope, as mentioned above, the feeble light emanating from the particular part of the living cell cannot be detected.

In general, the image pickup optical system of the microscope includes an objective lens, an imaging lens, and an image pickup means. In the conventional microscope, a numerical aperture NA of the objective lens is limited to about 1.4 at the maximum. It is for this reason that even in the case of the liquid immersion objective lens that oil is charged between a specimen and the objective lens so that the numerical aperture NA of the objective lens can be increased by the refractive index of oil, the refractive index of oil is limited to about 2.

In order to pick up a bright image of a luminous cell, it is necessary to increase the numerical aperture (namely, the numerical aperture NA' of the imaging lens) on the exit side. However, the numerical aperture NA' of the imaging lens used in the image pickup optical system of the conventional microscope is approximately 0.05 and 0.07 at the maximum. Also, the parfocal distance D of a common objective lens is about 40-65 mm.

Thus, the inventors of the present application have studied the numerical aperture NA' of the imaging lens with which a luminous image can be observed, using a plurality of kinds of objective lenses with numerical apertures larger than 0.05 as imaging lenses with respect to an objective lens with a numerical aperture NA of 1.4 and a parfocal distance D of 45 mm. In this case, the number of pixels of an image sensor is 765×510 pixels and a pixel size is 9×9μ.

As a result of the above examination, it is found that, in order to observe the luminous image, an imaging lens to be combined requires a numerical aperture NA' of at least 1.5 when the numerical aperture NA of the objective lens is 1.4 and the parfocal distance is 45 mm. Also, when the numerical aperture NA' of the imaging lens is set to 0.15, the magnification from the object to the image plane becomes nearly 10×(1.4÷0.15).

The inventors of the present application have derived the structure of the image pickup optical system required to efficiently observe the luminous image on the basis of the result of the above examination.

An image pickup area on the surface of the image sensor is obtained by dividing the product of the numerical aperture NA of the objective lens and the observation range by the numerical aperture NA' of the imaging lens. Hence, when the numerical aperture NA' of the imaging lens is merely increased, the image pickup area on the surface of the image sensor becomes small and the image pickup area ceases to be effectively utilizable for the surface of the image sensor. Consequently, it becomes necessary that the magnification from the object to the image plane is kept to about 4-10×, for instance.

In order to increase the numerical aperture NA' of the imaging lens to at least 0.15 while keeping the magnification from the object to the image plane to about 4-10×, it is necessary to enlarge the diameter of a light beam emerging from the objective lens. In order to enlarge the diameter of the light beam emerging from the objective lens, it becomes necessary to increase the numerical aperture NA of the objective lens. However, the feeble light image pickup optical system of the present invention is designed to satisfy the following condition:

$$5 \leq D \cdot NA' \leq 30 \text{ (mm)} \tag{1'}$$

where D is the parfocal distance of the objective lens and NA' is the numerical aperture of the imaging lens.

When Condition (1') is satisfied, it is possible to obtain an objective lens provided with a plurality of lens units in which even though the numerical aperture of the objective lens is increased, aberration can be completely corrected.

In contrast to this, below the lower limit of Condition (1'), the numerical aperture NA' of the imaging lens becomes small and the numerical aperture NA of the objective lens cannot be increased. This is unsuitable for the pickup of the luminous image. Alternatively, the parfocal distance of the objective lens is reduced and it is impossible that a plurality of lens units are arranged in the objective lens to obtain high performance of correction for aberration.

Beyond the upper limit of Condition (1'), the parfocal distance becomes too long, and the eclipse of light rays and a reduction of the transmittance due to the absorption of light of a glass material are caused in the objective lens, which is unfavorable.

In the feeble light image pickup optical system of the present invention, the distance from the mount position of the objective lens to the most object-side surface of the imaging lens is variable, and it is desirable to satisfy the following condition:

$$0.5FL < W < 1.2FL \text{ (mm)} \tag{2}$$

where W is the variable amount of the distance from the mount position of the objective lens to the most object-side surface of the imaging lens and FL is the focal length of the imaging lens.

When Condition (2) is satisfied, a nearly telecentric arrangement that the angle of incidence of light on an image pickup surface is about 0-5 degrees can be provided and it becomes possible to suppress a reduction of the amount of light due to shading inherent in the image sensor such as a CCD. In addition, for example, sufficient space for assembling an intermediate barrel unit such as that of a conventional fluorescence illumination system can be ensured between the objective lens and the imaging lens, and a systematic characteristic as the observation apparatus is improved.

In contrast to this, below the lower limit of Condition (2), the space between the objective lens and the imaging lens is narrowed and the systematic characteristic as the observation apparatus is degraded. Moreover, a light ray is obliquely incident on the image sensor and is affected by shading due to the image sensor, and thereby the amount of light surrounding the image sensor is reduced, which is unfavorable.

Beyond the upper limit of Condition (2), sufficient space can be provided between the objective lens and the imaging lens, but as in the case of "below the lower limit of Condition (2)" mentioned above, the light ray is obliquely incident on the image sensor and is affected by shading due to the image sensor, and thereby the amount of light surrounding the image sensor is reduced, which is unfavorable. In addition, the outside diameter of the imaging lens is enlarged to cause oversizing of the entire image pickup optical system.

In the feeble light image pickup optical system of the present invention, it is further desirable to satisfy the following conditions:

$$0.4 < D/FL < 5 \tag{3}$$

$$1 \leq D/\phi d < 3 \tag{4}$$

where D is the parfocal distance of the objective lens, FL is the focal length of the imaging lens, and $\phi d$ is the outside diameter of a connection at the mount of the objective lens.

The magnification from the object to the image plane is governed by the ratio of the focal length of the objective lens to the focal length LF of the imaging lens or by the ratio of the numerical aperture NA of the objective lens to the numerical aperture NA' of the imaging lens.

The image pickup area on the surface of the image sensor, as mentioned above, is obtained by dividing the product of the numerical aperture NA of the objective lens and the observation range by the numerical aperture NA' of the imaging lens. Hence, when the numerical aperture NA' of the imaging lens is increased, the image pickup area on the surface of the image sensor becomes small and the image pickup area cannot be effectively utilized for the surface of the image sensor. Thus, in order to efficiently image feeble light, it is desirable that the numerical aperture NA' of the imaging lens is set to 0.15 or more and the magnification from the object to the image plane is nearly 4-10×.

Conditions (3) and (4) are provided to efficiently image the feeble light at the magnification proper for observations with respect to the magnification from the object to the image plane.

When Condition (3) is satisfied, the magnification from the object to the image plane is taken as a proper magnification of nearly 4-10× and the objective lens having the numerical aperture suitable for a combination with the imaging lens having a numerical aperture NA' of 0.15 or more is obtained, so that eclipse in the objective lens is minimized and high performance of correction for aberration is acquired.

At the same time, when Condition (4) is satisfied, the effective diameter of the lens unit lying in the proximity of the mount position of the objective lens is completely ensured. Whereby, the numerical aperture NA' of the imaging lens can be increased and it becomes possible to keep a loss of the amount of marginal light to a minimum.

In contrast to this, below the lower limit of Condition (3), the parfocal distance of the objective lens becomes too short and the objective lens which is good in correction for aberration and high in NA cannot be constructed.

Beyond the upper limit of Condition (3), the parfocal distance of the objective lens becomes too long and a great loss of the amount of marginal light is caused in such a way that the transmittance is reduced due to the eclipse of rays in the objective lens and the absorption of light of the glass material. This is unfavorable.

Below the lower limit of Condition (4), the parfocal distance becomes too short and correaction for aberration of the objective lens becomes difficult.

Beyond the upper limit of Condition (4), the effective diameter of the lens lying in the proximity of the mount position of the objective lens becomes too small, and when the imaging lens with a numerical aperture NA' of 0.15 or more is used, the light ceases to be imaged at a proper magnification of about 4-10× with respect to the magnification from the object to the image plane.

In the feeble light image pickup optical system of the present invention, it is desirable that the back focus position of the objective lens is located on the object side of the mount position of the objective lens. By doing so, a plurality of lens units are arranged in the objective lens and high performance of correction for aberration can be attained.

In the feeble light image pickup optical system of the present invention, it is desirable that at least two interchangeable objective lenses are provided so that the back focus position of each objective lens is located on the object side of the mount position. By doing so, when objective lenses of different numerical apertures and parfocal distances are used, an observation application can be broadened.

In this case, it is desirable that the interchangeable objective lenses are constructed so that tolerances of the distance between the mount position and the back focus position are within ±15 mm in each interchangeable objective lens. By doing so, each of the objective lenses can be constructed as an objective lens in which a plurality of lens units are arranged and high performance of correction for aberration can be attained.

In the feeble light image pickup optical system of the present invention, it is desirable to have at least two objective lenses making their parfocal lengths different so as to be interchangeable and a mount-position adjusting means for changing the mount position of each of the interchangeable objective lenses in accordance with the parfocal distance of each objective lens so that even when either objective lens of different parfocal distance is interchanged, the front focus position of the objective lens interchanged and mounted practically coincides with that of the other objective lens. By doing so, the observation application can be broadened, and when the objective lens is interchanged, work for adjusting focusing can be eliminated.

In the feeble light image pickup optical system of the present invention, it is desirable that at least two imaging lenses are provided. By doing so, the observation application can be broadened.

In this case, it is good practice to make the imaging lenses interchangeable. Alternatively, a path splitting means may be provided on the opposite side of the object with respect to objective lens so that the imaging lens and the image pickup means are arranged on each of optical paths split through the path splitting means. By doing so, observations of light of different wavelengths can be made simultaneously.

In the feeble light image pickup optical system of the present invention, an illumination optical system for fluorescence observations may be interposed between the objective lens and the imaging lens. By doing so, the radiation observation and the fluorescence observation can be mutually switched in accordance with the application, and the observation application as the microscope system is further broadened.

In the feeble light image pickup optical system of the present invention, it is desirable that the objective lens is constructed as a liquid immersion objective lens or a solid immersion objective lens. By doing so, the numerical aperture NA' of the imaging lens can be made larger. This becomes advantageous for the radiation observation.

The microscope apparatus of the present invention is provided with the feeble light image pickup optical system of the present invention in any aspect described above.

In the microscope system of the present invention, when the microscope apparatus provided with the feeble light image pickup optical system in any aspect described above is taken as a first microscope apparatus and a microscope apparatus having a second infinity-corrected objective lens of different parfocal distance and emergence numerical aperture from the objective lens used in the first microscope apparatus and a second imaging lens of the same focal length as the imaging lens used in the first microscope apparatus is taken as a second microscope apparatus, the objective lens and the imaging lens in the first microscope apparatus satisfy the following conditions with respect to the second objective lens and the second imaging lens in the second microscope apparatus:

$$0.1 \leq NA2'/NA' \leq 0.88 \quad (5)$$

$$0.5 \leq D2/D \leq 0.87 \quad (6)$$

$$-15 < fb2 - fb < 15 \text{ (mm)} \quad (7)$$

where NA' is the numerical aperture of the imaging lens in the first microscope apparatus, D is the parfocal distance of the objective lens, fb is a distance, measured along the optical axis, from the surface of the object to the back focus position of the objective lens, NA2' is the numerical aperture of the second imaging lens in the second microscope apparatus, D2 is the parfocal distance of the second objective lens, and fb2 is a distance, measured along the optical axis, from the surface of the object to the back focus position of the second objective lens.

Conditions (5)-(7) determine conditions for having the interchangeability with the image pickup optical system in the conventional microscope system when the parfocal distance is taken as 45-90 mm, the focal length of the imaging lens as 180 mm, and the numerical aperture of the imaging lens as 0.03-0.07 in the microscope system of the present invention.

When Conditions (5)-(7) are satisfied as in the microscope system of the present invention, the interchangeability with the image pickup optical system in the conventional microscope system can be provided.

The lower limit of Condition (5) is the numerical value for providing the interchangeability between the image pickup optical system in the conventional microscope system in which the numerical aperture of the imaging lens is 0.03 and the feeble light image pickup optical system in the microscope system of the present invention in which the numerical aperture of the imaging lens is 0.3.

The upper limit of Condition (5) is the numerical value for providing the interchangeability between the image pickup optical system in the conventional microscope system in which the numerical aperture of the imaging lens is 0.07 and the feeble light image pickup optical system in the microscope system of the present invention in which the numerical aperture of the imaging lens is 0.08.

The lower limit of Condition (6) is the numerical value for providing the interchangeability between the image pickup optical system in the conventional microscope system in which the parfocal distance is 45 mm and the feeble light image pickup optical system in the microscope system of the present invention which satisfies a parfocal distance of 90 mm in the ISO.

The upper limit of Condition (6) is the numerical value for providing the interchangeability between the image pickup optical system in the conventional microscope system in which the parfocal distance is 65 mm and the feeble light image pickup optical system in the microscope system of the present invention which satisfies a parfocal distance of 75 mm.

Also, when a ring slit for phase-contrast observations and a prism for differential interference observations are used interchangeably with respect to the conventional microscope system and the microscope system of the present invention, it is necessary that both the systems are designed so that the back focus positions of the objective lenses from the surface of the object are located at almost the same position. Condition (7) determines the tolerances of the shift between their positions.

In the feeble light image pickup optical system of the present invention, it is desirable that a transmission illumination optical system constructed so that at least one of a bright-field observation, fluorescence observation, phase-contrast observation, differential interference contrast observation, and Hoffman modulation contrast observation can be made is provided on the opposite side of the objective lens, with the object between them.

In the feeble light image pickup optical system of the present invention, it is desirable that the transmission illumination optical system has a light source such as a halogen light source, an LED light source, or a fiber light source, and a condenser lens so that at least one of various optical elements capable of making the bright-field observation, fluorescence observation, phase-contrast observation, differential interference contrast observation, and Hoffman modulation contrast observation can be switched at about the pupil position of the condenser lens.

Illumination systems where the fluorescence observations are carried out are of two types: reflection illumination and transmission illumination. Here, when an optical system is constructed so that the fluorescence observation is carried out by the reflection illumination as in the feeble light image pickup optical system of the present invention, there is no need to interpose an illumination system between the objective lens and the imaging lens, and hence compactness of an arrangement between them can be achieved. In addition, the performance of correction for aberration of the imaging lens whose numerical aperture NA' is large and the image-side (image-sensor-side) telecentricity of the imaging lens are improved.

When an observation object is transparent, the optical system is constructed like the feeble light image pickup optical system of the present invention as the visualization technique of the observation object with the transmission illumination. In this case, the observation technique of one of a transmission fluorescence observation, phase-contrast observation, differential interference contrast observation, oblique illumination observation, and Hoffman modulation contrast observation is combined with the radiation observation. Whereby, the position and shape of the observation object are specified and at the same time, the luminous image can be acquired.

Also, as a light source used for each of various observations with transmission illumination and reflection fluorescence observations, the LED light source is desirable. When the LED light source is used, it becomes possible that the intensity of illumination light is electrically adjusted with low power consumption and switching of the fluorescence observation is carried out at a high speed.

In the feeble light image pickup optical system of the present invention, it is desirable to have an image processing means for superimposing a transmission illumination observation image of the object obtained through the image pickup means on a radiation observation image from the object. By doing so, the radiation observation image combined with the transmission observation image can be realized and the position and shape of the observation object can be specified to acquire the luminous image.

Also, the luminous image is extremely small in the amount of light. On the other hand, the transmission observation image with transmission illumination is larger in the amount of light than the radiation observation image. Thus, in order to make observations in a combination of the radiation observation image with the transmission observation image, the brightness of the luminous image and the transmission observation image, picked up by the image pickup means, is adjusted so that these two images are superimposed.

In the feeble light image pickup optical system of the present invention, it is desirable to have a display means for displaying the region of image areas superimposed through the image processing means on a display device, together with the superimposed images. By doing so, superimposed observation areas become clear and the position of the radiation observation object is easily held.

The inventors of the present application have considered the observation apparatus of the present invention and the observation system provided with this observation apparatus, with the invention of the feeble light image pickup optical system and the microscope apparatus provided with this optical system, set forth in Japanese Patent Application No. 2005-086644, by the present inventors, that is a basic invention of the feeble light image pickup optical system and the microscope apparatus provided with this optical system, and the microscope system provided with the microscope apparatus, as a momentum.

The inventors of the present application, as mentioned above, have examined the possibility of observations on light emanating from the living cell into which the luciferase gene is introduced, changing the conditions of the imaging lens constituting the image pickup optical system used in a common, conventional fluorescence microscope.

In the feeble light image pickup optical system of the present invention and the microscope apparatus provided with this optical system, and the microscope system provided with the microscope apparatus, based on Application No. 2005-086644, the structure of the image pickup optical system required to efficiently observe the luminous image have been derived in accordance with the result of the above examination, on the premise that the numerical aperture NA' of the imaging lens requires at least 0.15 for the purpose of imaging feeble light emanating from the particular part of the cell as bright as possible. Thus, in the feeble light image pickup optical system of the present invention and the microscope apparatus provided with this optical system, and the microscope system provided with the microscope apparatus, based on Application No. 2005-086644, unlike the conventional observation apparatus, the observation area is limited to an extremely small part.

However, the present invention, unlike the invention of Application No. 2005-086644, satisfies the demand for imaging the feeble light as bright as possible and at the same time, aims at the observation apparatus and the observation system that are capable of making observations over a wide range as in the observation apparatus such as the conventional microscope, that is, the observation apparatus and the observation system that are wider in visual field and higher in numerical aperture than the conventional observation apparatus and are capable of having the interchangeability with the conventional observation apparatus. In the present invention, therefore, the arrangement of the image pickup optical system required to efficiently observe the light is derived in accordance with the result of the above examination, on the premise that an imaging lens is used which is larger in numerical aperture than the imaging lens used in the image pickup optical system of the conventional observation apparatus and smaller in numerical aperture than the imaging lens used in the invention of Application No. 2005-086644.

In the observation apparatus of the present invention, in order to provide a wider visual field and a higher numerical aperture than in the conventional observation apparatus, the numerical aperture NA' of the imaging lens becomes larger than that of the imaging lens used in the image pickup optical system of the conventional observation apparatus when the imaging lens of the same focal length as in the imaging lens used in the image pickup optical system of the conventional observation apparatus is used. In addition, since correction for aberration becomes difficult simultaneously, more lenses are required, and in order to arrange such lenses, the distance, measured along the optical axis, from the surface of the object to the mount position of the objective lens, namely the parfocal distance D, must be increased.

The image pickup area on the surface of the image sensor is obtained by dividing the product of the numerical aperture NA of the objective lens and the observation range by the numerical aperture NA' of the imaging lens. Hence, when the numerical aperture NA' of the imaging lens is merely increased, the image pickup area on the surface of the image sensor becomes small and the image pickup area ceases to be effectively utilizable for the surface of the image sensor.

In order to increase the numerical aperture NA' of the imaging lens to about 0.08-0.09 while keeping the magnification from the object to the image plane to the same extent as in the conventional observation apparatus, it is necessary to enlarge the diameter of a light beam emerging from the objective lens.

In order to enlarge the diameter of the light beam emerging from the objective lens, it becomes necessary to increase the numerical aperture NA of the objective lens.

However, the observation apparatus of the present invention is designed to satisfy the following condition:

$$4.56 \leq D \cdot NA' < 10 \text{ (mm)} \tag{1''}$$

where D is the parfocal distance of the objective lens and NA' is the numerical aperture of the imaging lens.

When Condition (1'') is satisfied, it is possible to obtain the objective lens provided with a plurality of lens units in which aberration can be completely corrected even though the numerical aperture of the objective lens is increased.

In contrast to this, below the lower limit of Condition (1''), the numerical aperture NA' of the imaging lens becomes small and the numerical aperture NA of the objective lens cannot be increased, so that a wider visual field and a higher numerical aperture than in the conventional observation apparatus are not obtained. Alternatively, the parfocal distance of the objective lens becomes short and a plurality of lens units cannot be arranged in the objective lens to obtain high performance of correction for aberration.

Beyond the upper limit of Condition (1''), the parfocal distance becomes too long and the eclipse of light rays and a reduction of the transmittance due to the absorption of light of a glass material are caused in the objective lens, which is unfavorable.

In the observation apparatus of the present invention, the distance from the mount position of the objective lens to the most object-side surface of the imaging lens is variable, and it is desirable to satisfy the following condition:

$$0.5 FL < W < 1.2 FL \text{ (mm)} \tag{2}$$

where W is the variable amount of the distance from the mount position of the objective lens to the most object-side surface of the imaging lens and FL is the focal length of the imaging lens.

The present invention also has the purpose that the distance between the objective lens and the imaging lens is made variable and various optical units are movable in and out of the optical path along which a parallel beam of light travels between the objective lens and the imaging lens to thereby accommodate various observation methods. Condition (2) determines the variable limit of such a distance.

When Condition (2) is satisfied, a nearly telecentric arrangement that the angle of incidence of light on the image pickup surface is about 0-5 degrees can be provided and it becomes possible to suppress a reduction of the amount of light due to shading inherent in the image sensor such as a CCD. In addition, for example, sufficient space for assembling an intermediate barrel unit such as that of a conventional fluorescence illumination system can be ensured between the objective lens and the imaging lens, and a systematic characteristic as the observation apparatus is improved.

In contrast to this, below the lower limit of Condition (2), the space between the objective lens and the imaging lens is narrowed and the systematic characteristic as the observation apparatus is degraded. Moreover, a light ray is obliquely incident on the image sensor and is affected by shading due to the image sensor, and thereby the amount of light surrounding the image sensor is reduced, which is unfavorable.

Beyond the upper limit of Condition (2), sufficient space can be provided between the objective lens and the imaging lens, but as in the case of "below the lower limit of Condition (2)" mentioned above, the light ray is obliquely incident on the image sensor and is affected by shading due to the image sensor, and thereby the amount of light surrounding the image sensor is reduced, which is unfavorable. In addition, the outside diameter of the imaging lens is enlarged to cause oversizing of the entire image pickup optical system.

In the observation apparatus of the present invention, it is further desirable to satisfy the following conditions:

$$0.4 < D/FL < 1.2 \quad (3')$$

$$1 < D/\phi d < 2.75 \quad (4')$$

where D is the parfocal distance of the objective lens, FL is the focal length of the imaging lens, and $\phi d$ is the outside diameter of a connection at the mount of the objective lens.

The magnification from the object to the image plane is governed by the ratio of the focal length of the objective lens to the focal length LF of the imaging lens or by the ratio of the numerical aperture NA of the objective lens to the numerical aperture NA' of the imaging lens.

The image pickup area on the surface of the image sensor, as mentioned above, is obtained by dividing the product of the numerical aperture NA of the objective lens and the observation range by the numerical aperture NA' of the imaging lens. Hence, when the numerical aperture NA' of the imaging lens is increased, the image pickup area on the surface of the image sensor becomes small and the image pickup area cannot be effectively utilized for the surface of the image sensor.

Conditions (3') and (4') are provided to efficiently image the feeble light at the magnification proper for observations with respect to the magnification from the object to the image plane.

When Condition (3') is satisfied, the magnification from the object to the image plane becomes a proper magnification of the same extent as in the image pickup optical system of the conventional observation apparatus, and it becomes possible to obtain the objective lens with the numerical aperture NA suitable for a combination with the imaging lens whose numerical aperture NA' is larger than 0.05-0.06 of that of the imaging lens in the conventional observation apparatus and smaller than 0.15 of that of the imaging lens in the feeble light image pickup optical system of the invention of Application No. 2005-086644. Thus, high performance of correction for aberration is easily ensured.

At the same time, when Condition (4') is satisfied, the effective diameter of the lens unit lying in the proximity of the mount position of the objective lens is completely ensured. Whereby, the numerical aperture NA' of the imaging lens can be increased and it becomes possible to keep a loss of the amount of marginal light to a minimum.

In contrast to this, below the lower limit of Condition (3'), the parfocal distance of the objective lens becomes too short and the objective lens which is good in correction for aberration and high in NA cannot be constructed. Beyond the upper limit of Condition (3'), the parfocal distance of the objective lens becomes too long and a great loss of the amount of marginal light is caused in such a way that the transmittance is reduced due to the eclipse of rays in the objective lens and the absorption of light of the glass material. This is unfavorable.

Below the lower limit of Condition (4'), the parfocal distance becomes too short and correaction for aberration of the objective lens becomes difficult. Beyond the upper limit of Condition (4'), the effective diameter of the lens lying in the proximity of the mount position of the objective lens becomes too small, and in the use of the imaging lens whose numerical aperture NA' is larger than 0.05-0.06 of that of the imaging lens in the conventional observation apparatus and smaller than 0.15 of that of the imaging lens in the feeble light image pickup optical system of the invention of Application No. 2005-086644, the light ceases to be imaged at a proper magnification of the same extent as in the image pickup optical system of the conventional observation apparatus with respect to the magnification from the object to the image plane.

In the observation apparatus of the present invention, it is desirable that the back focus position of the objective lens is located on the object side of the mount position of the objective lens. By doing so, a plurality of lens units are arranged in the objective lens and high performance of correction for aberration can be attained.

In the observation apparatus of the present invention, it is desirable that at least two interchangeable objective lenses are provided so that the back focus position of each objective lens is located on the object side of the mount position. By doing so, when objective lenses of different numerical apertures and parfocal distances are used, the observation application can be broadened.

In this case, it is desirable that the interchangeable objective lenses are constructed so that tolerances of the distance between the mount position and the back focus position are within ±15 mm in each interchangeable objective lens. By doing so, each of the objective lenses can be constructed as an objective lens in which a plurality of lens units are arranged and high performance of correction for aberration can be attained.

In the observation apparatus of the present invention, it is desirable to have at least two objective lenses making their parfocal lengths different so as to be interchangeable and a mount-position adjusting means for changing the mount position of each of the interchangeable objective lenses in accordance with the parfocal distance of each objective lens so that even when either objective lens of different parfocal distance is interchanged, the front focus position of the objective lens interchanged and mounted practically coincides with that of the other objective lens. By doing so, the observation application can be broadened by providing the interchangeability with the conventional observation apparatus to some extent, and when the objective lens is interchanged, work for adjusting focusing can be eliminated.

In individual image pickup optical systems of the observation apparatus of the present invention and the conventional observation apparatus, if an attempt is made to equalize the focal lengths of the imaging lenses to maintain the same observation magnification, the focal lengths of the objective lenses also become equal. However, if an attempt is made to increase the parfocal distance D as in the observation apparatus of the present invention, a distance, measured along the optical axis, from the back focus position of the objective lens to the mount position of the objective lens is naturally increased, and the back focus position is located on the object side in the objective lens, looking from the mount position.

In the observation apparatus of the present invention, it is desirable that at least two imaging lenses are provided. By doing so, the observation application can be broadened. In this case, it is good practice to make the imaging lenses interchangeable. Alternatively, a path splitting means may be provided on the opposite side of the object with respect to objective lens so that the imaging lens and the image pickup means are arranged on each of optical paths split through the path splitting means. By doing so, observations of light of different wavelengths can be made simultaneously.

In the observation apparatus of the present invention, a reflection illumination unit such as an illumination system for fluorescence observations may be interposed between the objective lens and the imaging lens. By doing so, the radiation observation and the fluorescence observation can be mutually switched in accordance with the application, and the observation application as the observation system is further broadened.

In the observation apparatus of the present invention, it is desirable that the objective lens is constructed as a liquid immersion objective lens or a solid immersion objective lens. By doing so, the numerical aperture NA of the objective lens can be increased and the numerical aperture NA' of the imaging lens can be made larger.

The observation system of the present invention is provided with the observation apparatus of the present invention in any aspect described above and an image pickup means for picking up the image of the object from the observation apparatus.

In the observation system of the present invention, when the observation apparatus of the present invention in any aspect described above is taken as a first observation apparatus and an observation apparatus having a second infinity-corrected objective lens of different parfocal distance and emergence numerical aperture from the objective lens used in the first observation apparatus and a second imaging lens of the same focal length as the imaging lens used in the first observation apparatus is taken as a second observation apparatus, the objective lens and the imaging lens in the first observation apparatus satisfy the following conditions with respect to the second objective lens and the second imaging lens in the second observation apparatus:

$$0.3 \leq NA2'/NA' \leq 0.88 \quad (5')$$

$$0.5 \leq D2/D \leq 0.87 \quad (6)$$

$$-15 < fb2 - fb < 15 \text{ (mm)} \quad (7)$$

where NA' is the numerical aperture of the imaging lens in the first observation apparatus, D is the parfocal distance of the objective lens, fb is a distance, measured along the optical axis, from the surface of the object to the back focus position of the objective lens, NA2' is the numerical aperture of the second imaging lens in the second observation apparatus, D2 is the parfocal distance of the second objective lens, and fb2 is a distance, measured along the optical axis, from the surface of the object to the back focus position of the second objective lens.

Conditions (5')-(7) determine conditions for having the interchangeability with the image pickup optical system in the conventional microscope system in which the parfocal distance is 45-90 mm, the focal length of the imaging lens is 180 mm, and the numerical aperture of the imaging lens is 0.03-0.07 in the microscope system of the present invention.

When Conditions (5')-(7) are satisfied as in the observation system of the present invention, the interchangeability with the image pickup optical system in the conventional microscope system can be provided.

The lower limit of Condition (5') is the numerical value for providing the interchangeability between the image pickup optical system in the conventional microscope system in which the numerical aperture of the imaging lens is 0.03 and the image pickup optical system in the observation system of the present invention in which the numerical aperture of the imaging lens is 0.09.

The upper limit of Condition (5') is the numerical value for providing the interchangeability between the image pickup optical system in the conventional microscope system in which the numerical aperture of the imaging lens is 0.07 and the image pickup optical system in the observation system of the present invention in which the numerical aperture of the imaging lens is 0.08.

The lower limit of Condition (6) is the numerical value for providing the interchangeability between the image pickup optical system in the conventional microscope system in which the parfocal distance is 45 mm and the image pickup optical system in the observation system of the present invention which satisfies a parfocal distance of 90 mm in the ISO. The upper limit of Condition (6) is the numerical value for providing the interchangeability between the image pickup optical system in the conventional microscope system in which the parfocal distance is 65 mm and the image pickup optical system in the observation system of the present invention which satisfies a parfocal distance of 75 mm.

Also, when a ring slit for phase-contrast observations and a prism for differential interference observations are used interchangeably with respect to the conventional microscope system and the observation system of the present invention, it is necessary that both the systems are designed so that the back focus positions of the objective lenses from the surface of the object are located at almost the same position. Condition (7) determines the tolerances of the shift between their positions.

In the observation apparatus of the present invention, it is desirable that a transmission illumination optical system constructed so that at least one of a bright-field observation, fluorescence observation, phase-contrast observation, differential interference contrast observation, and Hoffman modulation contrast observation can be made is provided on the opposite side of the objective lens, with the object between them.

In the observation apparatus of the present invention, it is desirable that the transmission illumination optical system has a light source and a condenser lens so that at least one of various optical elements capable of making the bright-field observation, fluorescence observation, phase-contrast observation, differential interference contrast observation, and Hoffman modulation contrast observation can be switched at about the pupil position of the condenser lens.

Illumination systems where the fluorescence observations are carried out are of two types: reflection illumination and transmission illumination. Here, when an optical system is constructed so that the fluorescence observation is carried out by the reflection illumination as in the observation system of the present invention, there is no need to interpose an illumination system between the objective lens and the imaging lens, and hence compactness of an arrangement between them can be achieved. In addition, the performance of correction for aberration of the imaging lens whose numerical aperture NA' is large and the image-side (image-sensor-side) telecentricity of the imaging lens are improved.

When an observation object is transparent, the optical system is constructed like the observation apparatus of the present invention as the visualization technique of the observation object with the transmission illumination. In this case, the observation technique of one of a transmission fluorescence observation, phase-contrast observation, differential interference contrast observation, oblique illumination observation, and Hoffman modulation contrast observation is combined with the radiation observation. Whereby, the position and shape of the observation object are specified and at the same time, the luminous image can be acquired.

The observation system of the present invention comprises the observation apparatus of the present invention in any aspect described above, provided with the transmission illumination optical system, an image pickup means picking up an image of an object from the observation apparatus, and an image processing means for superimposing a transmission illumination observation image of the object obtained through the image pickup means on a radiation observation image from the object. By doing so, the radiation observation image combined with the transmission observation image can be realized and the position and shape of the observation object can be specified to acquire the luminous image.

Also, the luminous image is extremely small in the amount of light. On the other hand, the transmission observation image with transmission illumination is larger in the amount of light than the radiation observation image. Thus, in order to make observations in a combination of the radiation observation image with the transmission observation image, the brightness of the luminous image and the transmission observation image, picked up by the image pickup means, is adjusted so that these two images are superimposed.

In the observation system of the present invention, it is desirable to have a display means for displaying the region of image areas superimposed through the image processing means on a display device, together with the superimposed images. By doing so, superimposed observation areas become clear and the position of the radiation observation object is easily held.

By having the feeble light image pickup optical system and the microscope apparatus provided with this optical system, the microscope system provided with the microscope apparatus, and the observation apparatus of the present invention and the observation system provided with the observation apparatus, the observation or measurement means and the observation or measurement system provided with this means can be constructed. Also, in addition to the structures of the microscope apparatus and the observation apparatus in the present invention, the measurement means and the measurement system in the present invention can be realized by having a well-known measurement apparatus that converts optical information obtained at an observation position or an imaging position through these structures into numerical information and displays the information.

However, the observation or measurement means of the present invention is designed to satisfy the following condition:

$$4.56 \leq D \cdot NA' \leq 30 \text{ (mm)} \quad (1)$$

where D is the parfocal distance of the objective lens and NA' is the numerical aperture of the imaging lens.

When Condition (1) is satisfied, it is possible to obtain an objective lens provided with a plurality of lens units in which even though the numerical aperture of the objective lens is increased, aberration can be completely corrected.

In contrast to this, below the lower limit of Condition (1), the numerical aperture NA' of the imaging lens becomes small and the numerical aperture NA of the objective lens cannot be increased, so that the observation or measurement means of a wider visual field and a higher numerical aperture than in the conventional observation or measurement means are not obtained. Alternatively, the parfocal distance of the objective lens is reduced and it is impossible that a plurality of lens units are arranged in the objective lens to obtain high performance of correction for aberration. Beyond the upper limit of Condition (1), the parfocal distance becomes too long, and the eclipse of light rays and a reduction of the transmittance due to the absorption of light of a glass material are caused in the objective lens, which is unfavorable.

In the observation or measurement means of the present invention, the distance from the mount position of the objective lens to the most object-side surface of the imaging lens is variable, and it is desirable to satisfy the following condition:

$$0.5 FL < W < 1.2 FL \text{ (mm)} \quad (2)$$

where W is the variable amount of the distance from the mount position of the objective lens to the most object-side surface of the imaging lens and FL is the focal length of the imaging lens.

In the observation or measurement means of the present invention, the present invention also has the purpose that the distance between the objective lens and the imaging lens is made variable and various optical units are movable in and out of the optical path along which a parallel beam of light travels between the objective lens and the imaging lens to thereby accommodate various observation methods. Condition (2) determines the variable limit of such a distance.

When Condition (2) is satisfied, a nearly telecentric arrangement that the angle of incidence of light on the image pickup surface is about 0-5 degrees can be provided and it becomes possible to suppress a reduction of the amount of light due to shading inherent in the image sensor such as a CCD. In addition, for example, sufficient space for assembling an intermediate barrel unit such as that of a conventional fluorescence illumination system can be ensured between the objective lens and the imaging lens, and a systematic characteristic as the observation or measurement means is improved.

In contrast to this, below the lower limit of Condition (2), the space between the objective lens and the imaging lens is narrowed and the systematic characteristic as the observation or measurement means is degraded. Moreover, a light ray is obliquely incident on the image sensor and is affected by shading due to the image sensor, and thereby the amount of light surrounding the image sensor is reduced, which is unfavorable.

Beyond the upper limit of Condition (2), sufficient space can be provided between the objective lens and the imaging lens, but as in the case of "below the lower limit of Condition (2)" mentioned above, the light ray is obliquely incident on the image sensor and is affected by shading due to the image sensor, and thereby the amount of light surrounding the image sensor is reduced, which is unfavorable. In addition, the outside diameter of the imaging lens is enlarged to cause oversizing of the entire image pickup optical system.

In the observation or measurement means of the present invention, it is further desirable to satisfy the following conditions:

$$0.4 < D/FL < 5 \quad (3)$$

$$1 \leq D/\phi d < 3 \quad (4)$$

where D is the parfocal distance of the objective lens, FL is the focal length of the imaging lens, and $\phi d$ is the outside diameter of a connection at the mount of the objective lens.

The magnification from the object to the image plane is governed by the ratio of the focal length of the objective lens to the focal length LF of the imaging lens or by the ratio of the numerical aperture NA of the objective lens to the numerical aperture NA' of the imaging lens.

The image pickup area on the surface of the image sensor, as mentioned above, is obtained by dividing the product of the numerical aperture NA of the objective lens and the observation range by the numerical aperture NA' of the imaging lens. Hence, when the numerical aperture NA' of the imaging lens is increased, the image pickup area on the surface of the image sensor becomes small and the image pickup area cannot be effectively utilized for the surface of the image sensor. Thus, in order to efficiently image feeble light, it is desirable that the numerical aperture NA' of the imaging lens is set to 0.15 or more and the magnification from the object to the image plane is nearly 6-10×.

Conditions (3) and (4) are provided to efficiently image the feeble light at the magnification proper for observations with respect to the magnification from the object to the image plane in the observation or measurement means of the present invention.

When Condition (3) is satisfied, the magnification from the object to the image plane is taken as a proper magnification of nearly 6-10× and the objective lens having the numerical aperture NA suitable for a combination with the imaging lens having a numerical aperture NA' of 0.15 or more is obtained, so that eclipse in the objective lens is minimized and high performance of correction for aberration is acquired.

Alternatively, when Condition (3) is satisfied, the magnification from the object to the image plane becomes a proper magnification of the same extent as in the image pickup optical system of the conventional observation apparatus, and it becomes possible to obtain the objective lens with the numerical aperture NA suitable for a combination with the imaging lens whose numerical aperture NA' is larger than 0.05-0.06 of that of the imaging lens in the conventional observation apparatus and smaller than 0.15 of that of the imaging lens in the feeble light image pickup optical system of the invention of Application No. 2005-086644. Thus, high performance of correction for aberration is easily ensured.

When Condition (4) is satisfied at the same time that Condition (3) is satisfied, the effective diameter of the lens unit lying in the proximity of the mount position of the objective lens is completely ensured. Whereby, the numerical aperture NA' of the imaging lens can be increased and it becomes possible to keep a loss of the amount of marginal light to a minimum.

In contrast to this, below the lower limit of Condition (3), the parfocal distance of the objective lens becomes too short and the objective lens which is good in correction for aberration and high in NA cannot be constructed. Beyond the upper limit of Condition (3), the parfocal distance of the objective lens becomes too long and a great loss of the amount of marginal light is caused in such a way that the transmittance is reduced due to the eclipse of rays in the objective lens and the absorption of light of the glass material. This is unfavorable.

Below the lower limit of Condition (4), the parfocal distance becomes too short and correaction for aberration of the objective lens becomes difficult. Beyond the upper limit of Condition (4), the effective diameter of the lens lying in the proximity of the mount position of the objective lens becomes too small, and in the use of the imaging lens whose numerical aperture NA' is larger than 0.05-0.06 of that of the imaging lens in the conventional observation apparatus and smaller than 0.15 of that of the imaging lens in the feeble light image pickup optical system of the invention of Application No. 2005-086644, the light ceases to be imaged at a proper magnification of the same extent as in the image pickup optical system of the conventional observation apparatus with respect to the magnification from the object to the image plane.

In the observation or measurement means of the present invention, it is desirable that the back focus position of the objective lens is located on the object side of the mount position of the objective lens. By doing so, a plurality of lens units are arranged in the objective lens and high performance of correction for aberration can be attained.

In the observation or measurement means of the present invention, it is desirable that at least two interchangeable objective lenses are provided so that the back focus position of each objective lens is located on the object side of the mount position. By doing so, when objective lenses of different numerical apertures and parfocal distances are used, the observation application can be broadened.

In this case, it is desirable that the interchangeable objective lenses are constructed so that tolerances of the distance between the mount position and the back focus position are within ±15 mm in each interchangeable objective lens. By doing so, each of the objective lenses can be constructed as an objective lens in which a plurality of lens units are arranged and high performance of correction for aberration can be attained.

In the observation or measurement means of the present invention, it is desirable to have at least two objective lenses making their parfocal lengths different so as to be interchangeable and a mount-position adjusting means for changing the mount position of each of the interchangeable objective lenses in accordance with the parfocal distance of each objective lens so that even when either objective lens of different parfocal distance is interchanged, the front focus position of the objective lens interchanged and mounted practically coincides with that of the other objective lens. By doing so, the observation application can be broadened by having the interchangeability with the conventional observation apparatus to some extent, and when the objective lens is interchanged, work for adjusting focusing can be eliminated.

In individual image pickup optical systems of the observation or measurement means of the present invention and the conventional observation or measurement means, if an attempt is made to equalize the focal lengths of the imaging lenses to maintain the same observation magnification, the focal lengths of the objective lenses also become equal. However, if an attempt is made to increase the parfocal distance D as in the observation or measurement means of the present invention, a distance, measured along the optical axis, from the back focus position of the objective lens to the mount position of the objective lens is naturally increased, and the back focus position is located on the object side in the objective lens, looking from the mount position.

In the observation or measurement means of the present invention, it is desirable that at least two imaging lenses are provided. By doing so, the observation application can be broadened. In this case, it is good practice to make the imaging lenses interchangeable. Alternatively, a path splitting means may be provided on the opposite side of the object with respect to objective lens so that the imaging lens and the image pickup means are arranged on each of optical paths split through the path splitting means. By doing so, observations of light of different wavelengths can be made simultaneously.

In the observation or measurement means of the present invention, a reflection illumination unit such as an illumination system for fluorescence observations may be interposed between the objective lens and the imaging lens. By doing so, the radiation observation and the fluorescence observation can be mutually switched in accordance with the application, and the observation or measurement application as the observation or measurement system is further broadened.

In the observation or measurement means of the present invention, the objective lens may be constructed as a liquid immersion objective lens or a solid immersion objective lens. By doing so, the numerical aperture NA of the objective lens can be increased and the numerical aperture NA' of the imaging lens can be made larger. This is particularly advantageous for the radiation observation.

The observation or measurement system of the present invention is provided with the observation or measurement means of the present invention in any aspect described above and an image pickup means for picking up the image of the object from the observation or measurement means.

In the observation or measurement system of the present invention, when the observation or measurement means of the present invention in any aspect described above is taken as a first observation or measurement means and an observation or measurement means having a second infinity-corrected objective lens of different parfocal distance and emergence numerical aperture from the objective lens used in the first observation or measurement means and a second imaging lens of the same focal length as the imaging lens used in the first observation or measurement means is taken as a second observation or measurement means, the objective lens and the imaging lens in the first observation or measurement means satisfy the following conditions with respect to the second objective lens and the second imaging lens in the second observation or measurement means:

$$0.1 \leq NA2'/NA' \leq 0.88 \quad (5)$$

$$0.5 \leq D2/D \leq 0.87 \quad (6)$$

$$-15 < fb2 - fb < 15 \text{ (mm)} \quad (7)$$

where NA' is the numerical aperture of the imaging lens in the first observation or measurement means, D is the parfocal distance of the objective lens, fb is a distance, measured along the optical axis, from the surface of the object to the back focus position of the objective lens, NA2' is the numerical aperture of the second imaging lens in the second observation or measurement means, D2 is the parfocal distance of the second objective lens, and fb2 is a distance, measured along the optical axis, from the surface of the object to the back focus position of the second objective lens.

Conditions (5)-(7) determine conditions for having the interchangeability with the image pickup optical system in the conventional observation system in which the parfocal distance is 45-90 mm, the focal length of the imaging lens as 180 mm, and the numerical aperture of the imaging lens as 0.03-0.07, in the observation or measurement system of the present invention.

When Conditions (5)-(7) are satisfied as in the observation system of the present invention, the interchangeability with the image pickup optical system in the conventional observation or measurement system can be provided.

The lower limit of Condition (5) is the numerical value for providing the interchangeability between the image pickup optical system in the conventional observation or measurement system in which the numerical aperture of the imaging lens is 0.03 and the image pickup optical system in the observation or measurement system of the present invention in which the numerical aperture of the imaging lens is 0.3.

The upper limit of Condition (5) is the numerical value for providing the interchangeability between the image pickup optical system in the conventional observation or measurement system in which the numerical aperture of the imaging lens is 0.07 and the image pickup optical system in the observation or measurement system of the present invention in which the numerical aperture of the imaging lens is 0.08.

The lower limit of Condition (6) is the numerical value for providing the interchangeability between the image pickup optical system in the conventional observation or measurement system in which the parfocal distance is 45 mm and the image pickup optical system in the observation or measurement system of the present invention which satisfies a parfocal distance of 90 mm in the ISO.

The upper limit of Condition (6) is the numerical value for providing the interchangeability between the image pickup optical system in the conventional observation or measurement system in which the parfocal distance is 65 mm and the image pickup optical system in the observation or measurement system of the present invention which satisfies a parfocal distance of 75 mm.

Also, when a ring slit for phase-contrast observations and a prism for differential interference observations are used interchangeably with respect to the conventional observation or measurement system and the observation or measurement system of the present invention, it is necessary that both the systems are designed so that the back focus positions of the objective lenses from the surface of the object are located at almost the same position. Condition (7) determines the tolerances of the shift between their positions.

In the observation or measurement means of the present invention, it is desirable that a transmission illumination optical system constructed so that at least one of a bright-field observation, fluorescence observation, phase-contrast observation, differential interference contrast observation, and Hoffman modulation contrast observation can be made is provided on the opposite side of the objective lens, with the object between them.

In the observation or measurement means of the present invention, it is desirable that the transmission illumination optical system has a light source and a condenser lens so that at least one of various optical elements capable of making the bright-field observation, fluorescence observation, phase-contrast observation, differential interference contrast observation, and Hoffman modulation contrast observation can be switched at about the pupil position of the condenser lens.

Illumination systems where the fluorescence observations are carried out are of two types: reflection illumination and transmission illumination. Here, when an optical system is constructed so that the fluorescence observation is carried out by the transmission illumination as in the observation or measurement means of the present invention, there is no need to interpose an illumination system between the objective lens and the imaging lens, and hence compactness of an arrangement between them can be achieved. In addition, the performance of correction for aberration of the imaging lens whose numerical aperture NA' is large and the image-side (image-sensor-side) telecentricity of the imaging lens are improved.

When an observation object is transparent, the optical system is constructed like the observation or measurement means of the present invention as the visualization technique of the observation object with the transmission illumination. In this case, the observation technique of one of a transmission fluorescence observation, phase-contrast observation, differential interference contrast observation, oblique illumination observation, and Hoffman modulation contrast observation is combined with the radiation observation. Whereby, the position and shape of the observation object are specified and at the same time, the luminous image can be acquired.

The observation or measurement system of the present invention comprises the observation apparatus of the present invention in any aspect described above, provided with the transmission illumination optical system, an image pickup means picking up an image of an object from the observation apparatus, and an image processing means for superimposing a transmission illumination observation image of the object obtained through the image pickup means on a radiation observation image from the object. By doing so, the radiation observation image combined with the transmission observation image can be realized and the position and shape of the observation object can be specified to acquire the luminous image.

Also, the luminous image is extremely small in the amount of light. On the other hand, the transmission observation image with transmission illumination is larger in the amount of light than the radiation observation image. Thus, in order to make observations in a combination of the radiation observation image with the transmission observation image, the brightness of the luminous image and the transmission observation image, picked up by the image pickup means, is adjusted so that these two images are superimposed.

In the observation or measurement system of the present invention, it is desirable to have a display means for displaying the region of image areas superimposed through the image processing means on a display device, together with the superimposed images. By doing so, superimposed observation areas become clear and the position of the radiation observation object is easily held.

First Embodiment

Figure 2:
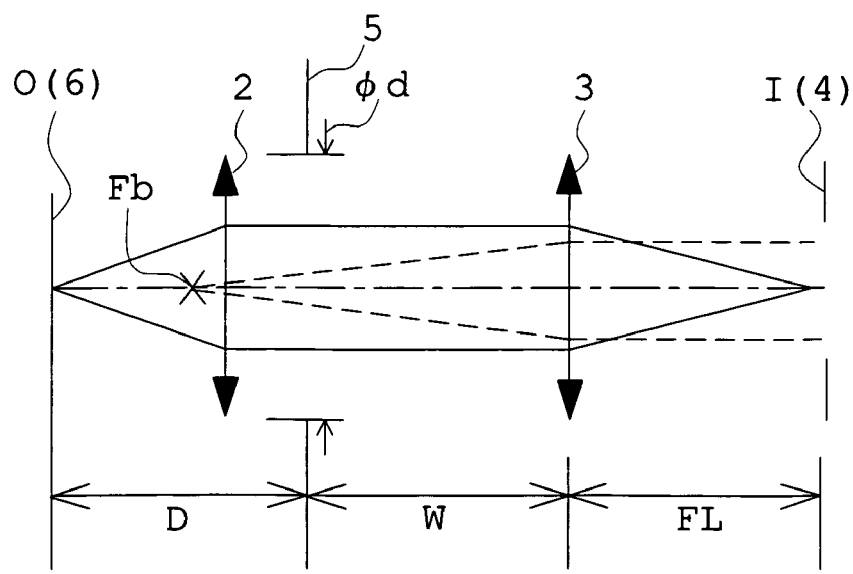
FIG. 2 is a view for explaining the principle of the feeble light image pickup optical system (or the image pickup optical system in the observation system) shown in FIG. 1.

FIG. 1 is a block diagram showing a schematic structure of the whole of the microscope apparatus provided with the feeble light image pickup optical system as the observation or measurement system provided with the observation or measurement means in the first embodiment of the present invention. FIG. 2 is a view for explaining the principle of the feeble light image pickup optical system shown in FIG. 1.

The microscope apparatus of the first embodiment comprises a feeble light image pickup optical system 1 and a feeble light image pickup information processing display means 7. Also, in FIG. 1, reference numeral 5 denotes the mount position of an objective lens 2 and 6 denotes an object such as a living specimen. In FIG. 2, reference symbol represents the surface of the object and I represents the position of an image pickup surface. The objective lens 2 is constructed as an infinity-corrected objective lens to convert feeble radiation from the object 6 into nearly parallel light. An imaging lens 3 collects the parallel light from the objective lens 2 to form the image of the object on the image pickup surface of an image pickup means 4. The image pickup means 4 is constructed as an image sensor such as a CCD or CMOS.

The feeble light image pickup information processing display means 7 is constructed, for example, as a personal computer and includes an image pickup control means (not shown in the figure) controlling the image pickup operation of the image pickup means 4, an image recording means (not shown) recording image information picked up by the image pickup means 4, a measurement means (not shown) converting the image information picked up by the image pickup means 4 into numerical information to measure the numerical information, and a display means (not shown) displaying the image information picked up by the image pickup means 4 and the numerical information measured by the measurement means.

The feeble light image pickup optical system 1 is designed to satisfy the following condition:

$$5 \leq D \cdot NA' \leq 30 \text{ (mm)} \tag{1'}$$

where D is the parfocal distance of the objective lens 2 and NA' is the numerical aperture of the imaging lens 3.

The feeble light image pickup optical system 1 is such that a distance from the mount position 5 of the objective lens 2 to the most object-side surface of the imaging lens 3 is variable, and is designed to satisfy the following condition:

$$0.5FL < W < 1.2FL \text{ (mm)} \tag{2}$$

where W is the variable amount of the distance from the mount position 5 of the objective lens 2 to the most object-side surface of the imaging lens 3, and FL is the focal length of the imaging lens 3.

The feeble light image pickup optical system 1 is designed to further satisfy the following conditions:

$$0.4 < D/FL < 5 \tag{3}$$

$$1 \leq D/\phi d < 3 \tag{4}$$

where $\phi d$ is the outside diameter of a connection at the mount of the objective lens 2.

The objective lens 2 is constructed so that the back focus position Fb is located on the object side of the mount position 5 of the objective lens 2.

In the microscope apparatus provided with the feeble light image pickup optical system 1 of the first embodiment constructed mentioned above, feeble light emanating from the object 6 is converted into parallel light through the objective lens 2, is imaged on the image pickup surface of the image pickup means 4 through the imaging lens 3, and is picked up as an image through the image pickup means 4. The luminous image picked up by the image pickup means 4 is fed to the feeble light image pickup information processing display means 7. The image information fed to the feeble light image pickup information processing display means 7 is recorded through the image recording means (not shown) and is converted into the numerical information through the measurement means (not shown) so that the numerical information is measured. At the same time, the image information and the measured numerical information are displayed through the display means (not shown).

In this case, according to the microscope apparatus provided with the feeble light image pickup optical system 1 of the first embodiment, a bright image of a luminous cell can be picked up and the observation of a luminous image becomes possible. Since the feeble light image pickup optical system 1 satisfies Condition (1'), the objective lens can be constructed as the objective lens 2 provided with a plurality of lens units in which aberration can be completely corrected even when the numerical aperture is increased.

Further, since the feeble light image pickup optical system 1 satisfies Condition (2), a nearly telecentric arrangement that the angle of incidence of light on the image pickup surface is about 0-5 degrees can be provided and it becomes possible to suppress a reduction of the amount of light due to shading inherent in the image sensor such as a CCD. In addition, for example, sufficient space for assembling an intermediate barrel unit such as that of a conventional fluorescence illumination system can be ensured between the objective lens 2 and the imaging lens 3, and a systematic characteristic as the observation apparatus is improved.

Since the feeble light image pickup optical system 1 satisfies Condition (3), the magnification from the object to the image plane is taken as a proper magnification of nearly 6-10× and the objective lens 2 having the numerical aperture suitable for a combination with the imaging lens 3 having a numerical aperture NA' of 0.15 or more is obtained, so that eclipse in the objective lens 2 is minimized and high performance of correction for aberration is acquired.

Since the feeble light image pickup optical system 1 satisfies Condition (4), the effective diameter of the lens unit lying in the proximity of the mount position 5 of the objective lens 2 is completely ensured. Whereby, the numerical aperture NA' of the imaging lens 3 can be increased and it becomes possible to keep a loss of the amount of marginal light to a minimum.

Also, the back focus position Fb of the objective lens 2 in the feeble light image pickup optical system 1 is located on the object side of the mount position 5 of the objective lens 2, and hence a plurality of lens units can be arranged in the objective lens 2 to obtain high performance of correction for aberration.

Second Embodiment

Figure 3:
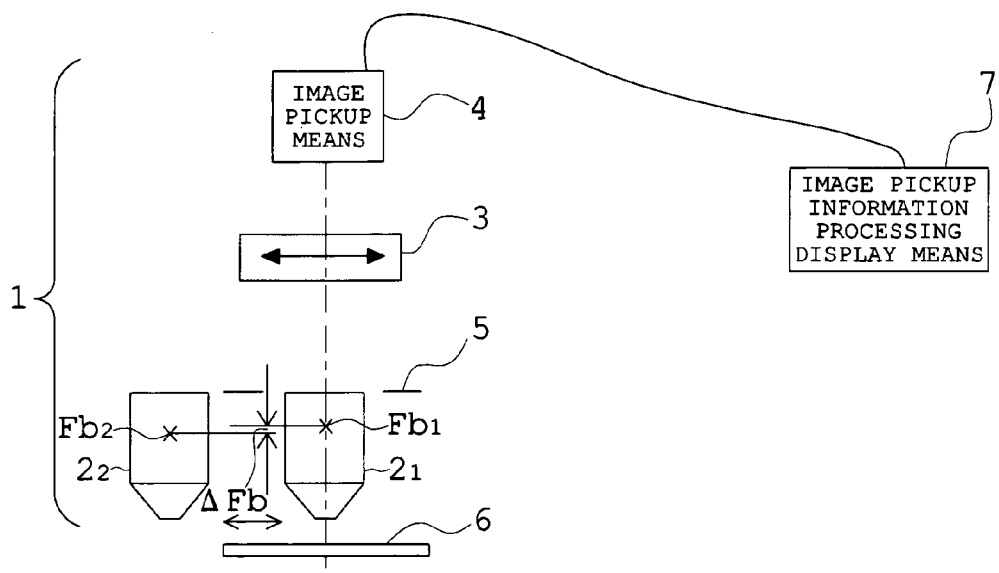
FIG. 3 is a block diagram showing a schematic structure of the whole of the microscope apparatus provided with the feeble light image pickup optical system (or the observation system provided with the observation apparatus) as the observation or measurement system provided with the observation or measurement means in a second embodiment of the present invention.

FIG. 3 is a block diagram showing a schematic structure of the whole of the microscope apparatus provided with the feeble light image pickup optical system as the observation or measurement system provided with the observation or measurement means in the second embodiment of the present invention.

In the second embodiment, the feeble light image pickup optical system 1 is provided with two interchangeable objective lenses $2_1$ and $2_2$. The interchangeable objective lenses $2_1$ and $2_2$ are constructed so that tolerances ΔFb of the distances from the mount position 5 to back focus positions $Fb_1$ and $Fb_2$ are within ±15 mm.

According to the microscope apparatus provided with the feeble light image pickup optical system of the second embodiment constructed as mentioned above, the objective lenses of different numerical apertures and parfocal distances are used and thereby the observation application can be broadened. Since the interchangeable objective lenses $2_1$ and $2_2$ are constructed so that tolerances ΔFb of the distances from the mount position 5 to the back focus positions $Fb_1$ and $Fb_2$ are within ±15 mm. Each of the objective lenses $2_1$ and $2_2$ can be constructed as the objective lens in which a plurality of lens units can be arranged to obtain high performance of correction for aberration.

Other structures, functions, and effects are almost the same as in the microscope apparatus provided with the feeble light image pickup optical system of the first embodiment.

Third Embodiment

Figure 4:
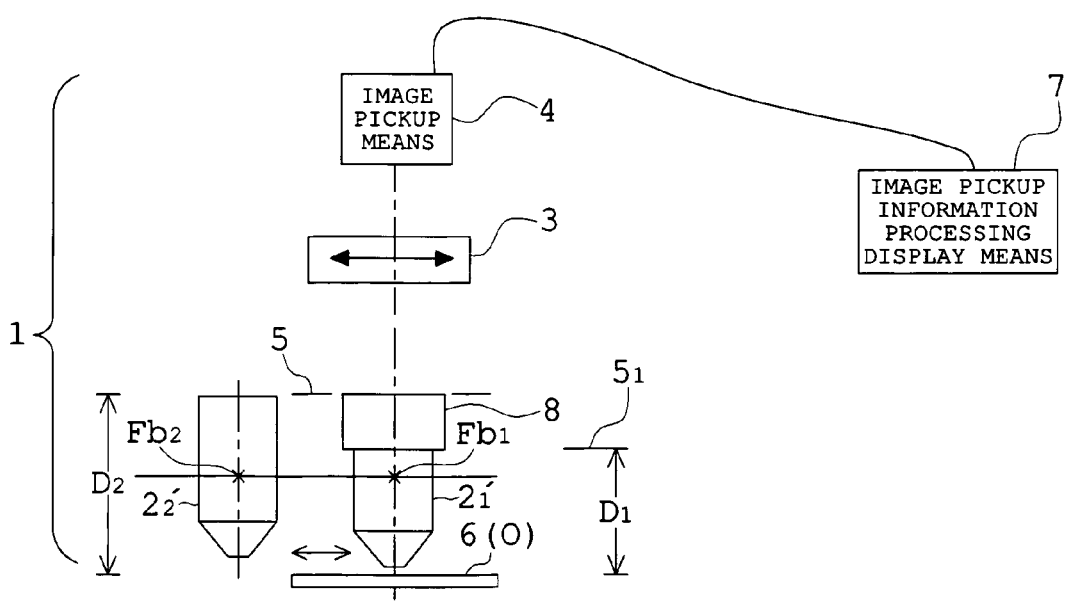
FIG. 4 is a block diagram showing a schematic structure of the whole of the microscope apparatus provided with the feeble light image pickup optical system (or the observation system provided with the observation apparatus) as the observation or measurement system provided with the observation or measurement means in a third embodiment of the present invention.

FIG. 4 is a block diagram showing a schematic structure of the whole of the microscope apparatus provided with the feeble light image pickup optical system as the observation or measurement system provided with the observation or measurement means in the third embodiment of the present invention.

The feeble light image pickup optical system 1 of the third embodiment is provided with two interchangeable objective lenses $2_1'$ and $2_2'$ having different parfocal distances $D_1$ and $D_2$, respectively. A spacer is provided as a mount-position adjusting means 8 changing the mount positions of the objective lenses $2_1'$ and $2_2'$ in accordance with the parfocal distances $D_1$ and $D_2$ of the objective lenses $2_1'$ and $2_2'$ so that even when either of the objective lenses $2_1'$ and $2_2'$ is interchanged, the front focus position of each objective lens interchanged and mounted practically coincides with a surface O of the object 6.

According to the microscope apparatus provided with the feeble light image pickup optical system of the third embodiment constructed as mentioned above, the observation application can be broadened. Since the mount-position adjusting means 8 is provided, work required to adjust focusing when the objective lenses $2_1'$ and $2_2'$ are interchanged can be eliminated.

Other structures, functions, and effects are almost the same as in the microscope apparatus provided with the feeble light image pickup optical system of the first embodiment.

Fourth Embodiment

Figure 5:
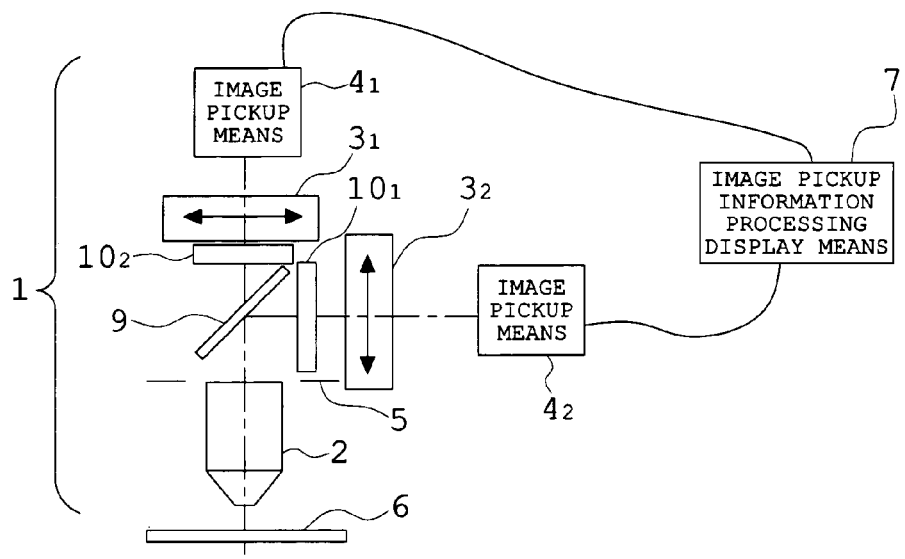
FIG. 5 is a block diagram showing a schematic structure of the whole of the microscope apparatus provided with the feeble light image pickup optical system (or the observation system provided with the observation apparatus) as the observation or measurement system provided with the observation or measurement means in a fourth embodiment of the present invention.

FIG. 5 is a block diagram showing a schematic structure of the whole of the microscope apparatus provided with the feeble light image pickup optical system as the observation or measurement system provided with the observation or measurement means in the fourth embodiment of the present invention.

The feeble light image pickup optical system 1 of the fourth embodiment is provided with a dichroic mirror or a beam splitter as a path splitting means 9 on the opposite side of the object 6 with respect to the objective lens 2 and has imaging lenses $3_1$ and $3_2$ and image pickup means $4_1$ and $4_2$ on individual optical paths split through the path splitting means 9. Also, in FIG. 5, reference numerals $10_1$ and $10_2$ represent spectral filters arranged on individual optical paths split through the path splitting means 9.

According to the microscope apparatus provided with the feeble light image pickup optical system of the fourth embodiment thus constructed, radiation of different wavelengths of a plurality of kinds can be observed simultaneously.

Other structures, functions, and effects are almost the same as in the microscope apparatus provided with the feeble light image pickup optical system of the first embodiment.

Fifth Embodiment

Figure 6:
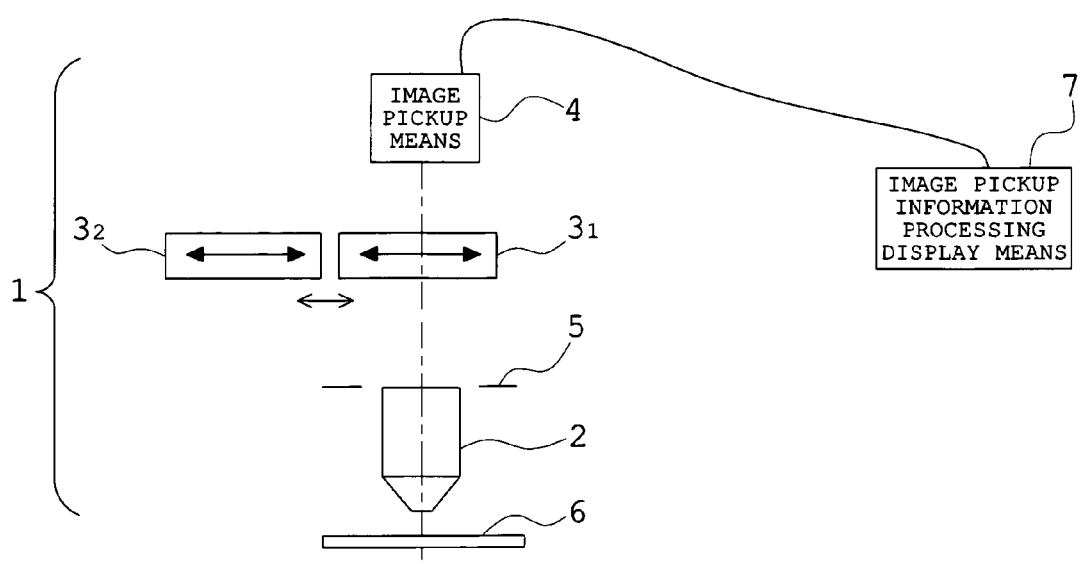
FIG. 6 is a block diagram showing a schematic structure of the whole of the microscope apparatus provided with the feeble light image pickup optical system (or the observation system provided with the observation apparatus) as the observation or measurement system provided with the observation or measurement means in a fifth embodiment of the present invention.

FIG. 6 is a block diagram showing a schematic structure of the whole of the microscope apparatus provided with the feeble light image pickup optical system as the observation or measurement system provided with the observation or measurement means in the fifth embodiment of the present invention.

The feeble light image pickup optical system 1 of the fifth embodiment is provided with two interchangeable imaging lenses $3_1$ and $3_2$. According to the microscope apparatus provided with the feeble light image pickup optical system of the fifth embodiment thus constructed, for example, the numerical apertures NA' of the imaging lenses $3_1$ and $3_2$ are made different and thereby observations can be carried out at different magnifications from the object 6 to the image plane. As such, the observation application can be broadened.

Other structures, functions, and effects are almost the same as in the microscope apparatus provided with the feeble light image pickup optical system of the first embodiment.

Sixth Embodiment

Figure 7:
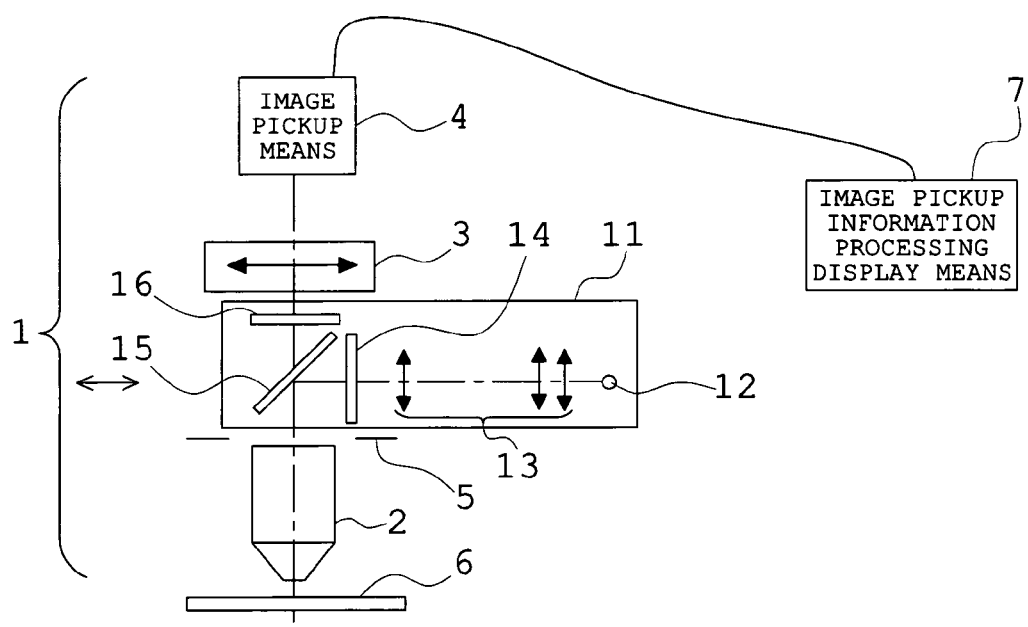
FIG. 7 is a block diagram showing a schematic structure of the whole of the microscope apparatus provided with the feeble light image pickup optical system (or the observation system provided with the observation apparatus) as the observation or measurement system provided with the observation or measurement means in a sixth embodiment of the present invention.

FIG. 7 is a block diagram showing a schematic structure of the whole of the microscope apparatus provided with the feeble light image pickup optical system as the observation or measurement system provided with the observation or measurement means in the sixth embodiment of the present invention.

The feeble light image pickup optical system of the sixth embodiment is provided with an illumination optical system 11 for the fluorescence observation that is movable in and out of the optical path, between the objective lens 2 and the imaging lens 3. The illumination optical system 11 for the fluorescence observation includes an LED light source 12, an illumination lens 13, an exciter filter 14, a dichroic mirror 15, and a barrier filter 16 cutting off light other than fluorescent light.

According to the microscope apparatus provided with the feeble light image pickup optical system of the sixth embodiment constructed as mentioned above, when the fluorescence illumination optical system 11 is mounted, a fluorescence microscope observation can be carried out. Specifically, light emitted from the LED light source 12 travels through the illumination lens 13 and light with excitation wavelength passes through the exciter filter 14 to irradiate the object 6 through the dichroic mirror 15 and the objective lens 2. Light from the object 6 travels through the objective lens 2 and light other than excitation light passes through the dichroic mirror 15, so that light other than fluorescent light is eliminated through the barrier filter 16 and only the fluorescent light is imaged by the image pickup means 4.

On the other hand, when the fluorescence illumination optical system 11 is removed, radiation can be observed like the first embodiment. Also, the fluorescence illumination optical system 11 may be fixedly mounted. In this case, it is good practice that the dichroic mirror 15 and the barrier filter 16 are made movable in and out of the optical path so that when radiation is observed, the dichroic mirror 15 and the barrier filter 16 are removed.

Other structures, functions, and effects are almost the same as in the microscope apparatus provided with the feeble light image pickup optical system of the first embodiment.

Seventh Embodiment

Figure 8:
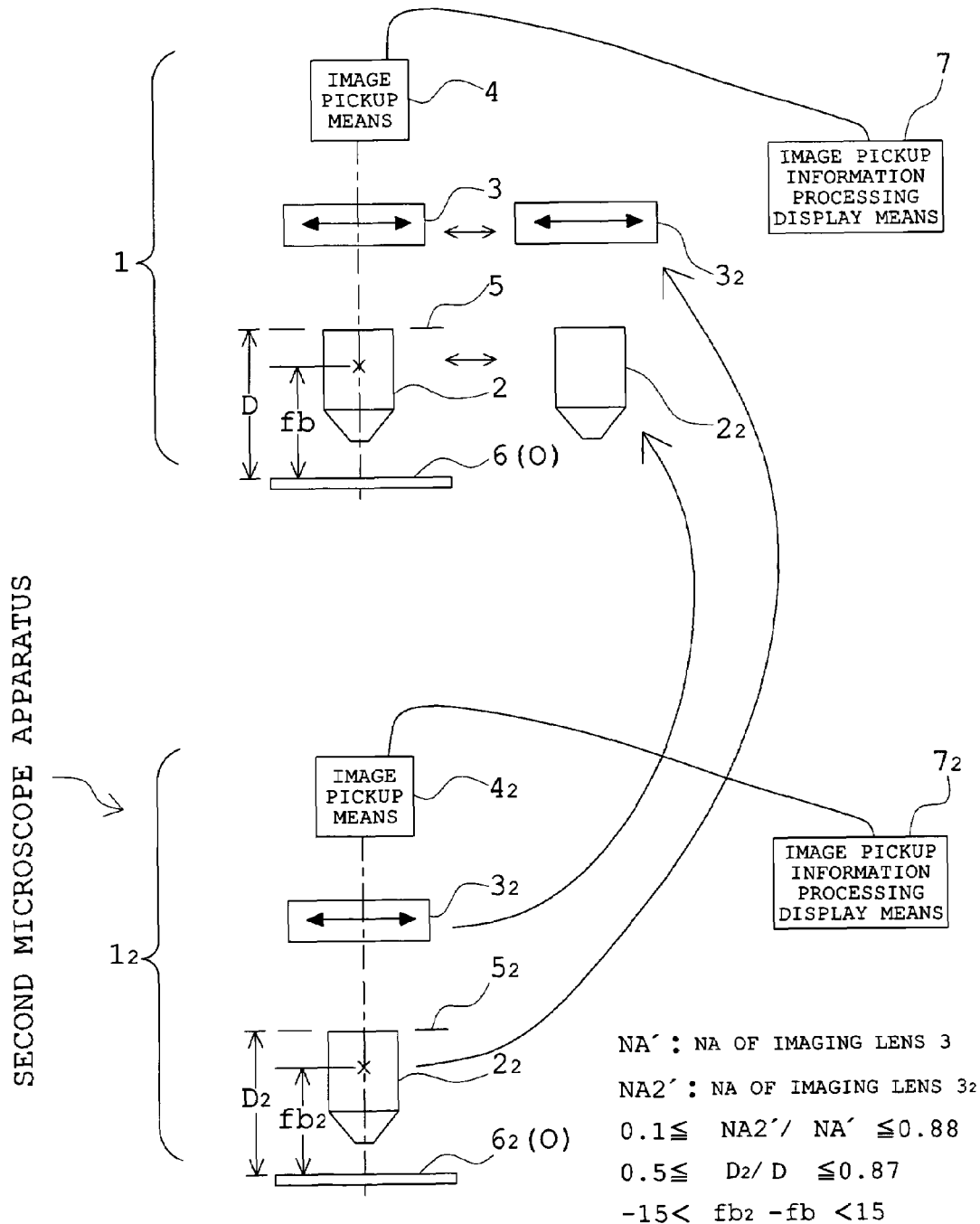
FIG. 8 is an explanatory view showing schematically the whole of the microscope system provided with the feeble light image pickup optical system (or the observation system provided with the observation apparatus) as the observation or measurement system provided with the observation or measurement means in a seventh embodiment of the present invention.

FIG. 8 is an explanatory view showing schematically the whole of the microscope system provided with the feeble light image pickup optical system as the observation or measurement system provided with the observation or measurement means in a seventh embodiment of the present invention.

In addition to the microscope apparatus provided with the feeble light image pickup optical system of any embodiment mentioned above, the microscope system of the seventh embodiment is designed so that the objective lens 2 and the imaging lens 3 satisfy the following conditions:

$$0.1 \leq NA2'/NA' \leq 0.88 \quad (5)$$

$$0.5 \leq D2/D \leq 0.87 \quad (6)$$

$$-15 < fb2 - fb < 15 \text{ (mm)} \quad (7)$$

where NA' is the numerical aperture of the imaging lens 3, D is the parfocal distance of the objective lens 2, fb is a distance, measured along the optical axis, from the surface of the object to the back focus position of the objective lens 2, NA2' is the numerical aperture of the second imaging lens $3_2$, D2 is the parfocal distance of the second objective lens $2_2$, and fb2 is a distance, measured along the optical axis, from the surface of the object to the back focus position of the second objective lens $2_2$.

The second microscope apparatus is a conventional, common microscope apparatus and has the second objective lens $2_2$ and the second imaging lens $3_2$. The second image pickup optical system $1_2$ includes the second objective lens $2_2$, the second imaging lens $3_2$, and the image pickup means $4_2$. Also, in FIG. 8, reference numeral $5_2$ denotes a mount position, $6_2$ denotes an object (a living specimen), and $7_2$ denotes an image pickup information processing display means.

The second objective lens $2_2$ is constructed as an infinity-corrected objective lens that is different in parfocal distance and emergence numerical aperture from the objective lens 2. The second imaging lens $3_2$ is equal in focal length to the imaging lens 3.

According to the microscope system of the seventh embodiment, the objective lens 2 and the imaging lens 3 can be interchanged with the second objective lens $2_2$ and the second imaging lens $3_2$, respectively, provided in the second microscope apparatus. Thus, according to the microscope system of the seventh embodiment, the interchangeability with the conventional microscope system can be provided and high extensiveness is obtained.

Eighth Embodiment

FIG. 9 is a block diagram showing a schematic structure of the whole of the microscope apparatus provided with the feeble light image pickup optical system as the observation or measurement system provided with the observation or measurement means in the eighth embodiment of the present invention.

The microscope apparatus of the eighth embodiment includes a feeble light image pickup optical system 1' and an image pickup information processing display means 7'. In addition to nearly the same structure as any feeble light image pickup optical system 1 in the microscope apparatus of one of the first to third embodiments, the feeble light image pickup optical system 1' has a transmission illumination optical system 21 on the opposite side of the objective lens 2, with the object 6 between them.

The transmission illumination optical system 21 has an LED light source 22 and a condenser lens 23. It is constructed so that at least one of the bright-field observation, fluorescence observation, phase-contrast observation, differential interference contrast observation, and Hoffman modulation contrast observation becomes possible. Also, reference numeral 24 designates an aperture stop and 25 designates a field stop.

In the eighth embodiment, an exciter filter 26 transmitting only a predetermined excitation wavelength and blocking other wavelengths is interposed between the LED light source 22 and the condenser lens 23, and a barrier filter 27 transmitting only a predetermined fluorescence wavelength and radiation wavelength and blocking other wavelengths is interposed between the objective lens 2 and the imaging lens 3, so that the fluorescence observation can be made by transmission illumination. The filters 26 and 27 are provided to be movable in and out of the optical path so that they are arranged on the optical path in the fluorescence observation and are removed therefrom in observations other than the fluorescence observation.

The aperture stop 24 is located at about the pupil position of the condenser lens 13 so that it is movable in and out of the optical path through a slider 30. In addition to the aperture stop 24, the slider 30 includes a ring slit 28 for the phase-contrast observation, a prism 29 for the differential interference contrast observation, and a polarizing plate and a slit aperture plate for the Hoffman modulation contrast observation (both not shown).

The microscope apparatus provided with the feeble light image pickup optical system of the eighth embodiment is constructed so that at least one of various optical elements capable of making the bright-field observation (with the aperture stop 24), the fluorescence observation (with the aperture stop 24), the phase-contrast observation (with the ring slit 28 for the phase-contrast observation), the differential interference contrast observation (with the prism 29 for the differential interference contrast observation), and the Hoffman modulation contrast observation (with the polarizing plate and the slit aperture plate for the Hoffman modulation contrast observation) can be switched through a slider 30 at about the pupil position of the condenser lens in accordance with the observation application.

In addition to the switching operation of the slider 30, the microscope apparatus is designed so that, in observations other than the fluorescence observation, the filters 26 and 27 are removed from the optical path. In the phase-contrast observation, the objective lens 2 is replaced with one for phase contrast. Moreover, in the Hoffman modulation contrast observation, a modulator for the Hoffman modulation contrast observation is mounted close to the objective lens 2.

Besides the function of the image pickup information processing display means 7 in the microscope apparatus provided with the feeble light image pickup optical system of each of the first to seventh embodiments, the image pickup information processing display means 7' has an image processing means (not shown) for superimposing the transmission illumination observation image of the object obtained through the image pickup means 4 on the radiation observation image from the object. The image pickup information processing display means 7' further has a display means (not shown) for displaying the image areas superimposed through the image processing means on a display device, together with the superimposed images, for example, with its contour or a circular of rectangular line.

According to the microscope apparatus provided with the feeble light image pickup optical system of the eighth embodiment, there is no need to interpose the illumination system between the objective lens and the imaging lens, and thus compactness of an arrangement between them can be achieved. Furthermore, the performance of correction for aberration of the imaging lens whose numerical aperture NA' is large and the image-side (image-sensor-side) telecentricity of the imaging lens are improved.

Even when the observation object is transparent, the observation technique of one of the transmission fluorescence observation, phase-contrast observation, differential interference contrast observation, oblique illumination observation, and Hoffman modulation contrast observation is combined with the radiation observation and the superimposed observation images can be obtained. Whereby, the position and shape of the observation object are specified and at the same time, the luminous image can be acquired. The superimposed image areas can be displayed together with the superimposed images on the display device and the superimposed observation areas become clear so that the position of the radiation observation of the observation object is easily held.

Other structures, functions, and effects are almost the same as in the microscope apparatus provided with the feeble light image pickup optical system of the first embodiment.

Ninth Embodiment

The observation or measurement system provided with the observation or measurement means in the ninth embodiment is constructed as the observation system provided with the observation apparatus. The schematic structure of the entire observation system of the ninth embodiment is nearly the same as that of the observation system of the first embodiment shown in FIG. 1. The principle of the image pickup optical system in the observation system of the ninth embodiment is nearly the same as that of the image pickup optical system in the observation system of the first embodiment shown in FIG. 2. Hence, in the explanation of the observation system provided with the observation apparatus of the ninth embodiment, FIGS. 1 and 2 are quoted.

The observation apparatus of the ninth embodiment is designed to satisfy the following condition:

$$4.56 \leq D \cdot NA' < 10 \text{ (mm)} \tag{1''}$$

where D is the parfocal distance of the objective lens 2 and NA' is the numerical aperture of the imaging lens 3.

The observation apparatus is such that the distance from mount position 5 of the objective lens 2 to the most object-side surface of the imaging lens 3 is variable, and is designed to satisfy the following condition:

$$0.5FL < W < 1.2FL \text{ (mm)} \tag{2}$$

where W is the variable amount of the distance from the mount position 5 of the objective lens 2 to the most object-side surface of the imaging lens 3, and FL is the focal length of the imaging lens 3.

The observation apparatus is also designed to satisfy the following conditions:

$$0.4 < D/FL < 1.2 \tag{3'}$$

$$1 < D/\phi d < 2.75 \tag{4'}$$

where $\phi d$ is the outside diameter of a connection at the mount of the objective lens.

The objective lens 2 is constructed so that the back focus position Fb of the objective lens 2 is located on the object side of the mount position 5 of the objective lens 2. Other structures are almost the same as in the observation system of the first embodiment shown in FIG. 1.

In the observation system provided with the observation apparatus of the ninth embodiment constructed mentioned above, light from the object 6 is converted into parallel light through the objective lens 2, is imaged on the image pickup surface of the image pickup means 4 through the imaging lens 3, and is picked up as an image through the image pickup means 4. The observation image picked up by the image pickup means 4 is fed to the image pickup information processing display means 7. The image information fed to the image pickup information processing display means 7 is recorded through the image recording means (not shown) and is converted into the numerical information through the measurement means (not shown) so that the numerical information is measured. At the same time, the image information and the measured numerical information are displayed through the display means (not shown).

In this case, according to the observation system provided with the observation apparatus of the ninth embodiment, the observation apparatus satisfies Condition (1'') and thus the objective lens can be constructed as the objective lens 2 provided with a plurality of lens units in which aberration can be completely corrected even when the numerical aperture is increased.

Further, since the observation apparatus satisfies Condition (2), a nearly telecentric arrangement that the angle of incidence of a chief ray on the image pickup surface is about 0-5 degrees can be provided and it becomes possible to suppress a reduction of the amount of light due to shading inherent in the image sensor such as a CCD. In addition, for example, sufficient space for assembling an intermediate barrel unit such as that of a conventional fluorescence illumination system can be ensured between the objective lens 2 and the imaging lens 3, and a systematic characteristic as the observation apparatus is improved.

Since the observation apparatus further satisfies Condition (3'), the magnification from the object to the image plane becomes a proper magnification of the same extent as in (the image pickup optical system of) the conventional observation apparatus, and it becomes possible to obtain the objective lens 2 with the numerical aperture NA suitable for a combination with the imaging lens whose numerical aperture NA' is larger than 0.05-0.06 of that of the imaging lens in (the image pickup optical system of) the conventional observation apparatus and smaller than 0.15 of that of the imaging lens in the feeble light image pickup optical system of the invention of Application No. 2005-086644. Thus, eclipse in the objective lens 2 is minimized and high performance of correction for aberration is acquired.

At the same time, since the observation apparatus satisfies Condition (4'), the effective diameter of the lens unit lying in the proximity of the mount position 5 of the objective lens 2 is completely ensured. Whereby, the numerical aperture NA' of the imaging lens 3 can be increased and it becomes possible to keep a loss of the amount of marginal light to a minimum.

Also, the back focus position Fb of the objective lens 2 in the observation apparatus is located on the object side of the mount position 5 of the objective lens 2, and hence a plurality of lens units can be arranged in the objective lens 2 to obtain high performance of correction for aberration.

According to the observation system provided with the observation apparatus of the ninth embodiment, therefore, it becomes possible to provide a high NA while having a wide observation range to transmit a feeble light signal at a high S/N ratio.

Tenth Embodiment

The observation or measurement system provided with the observation or measurement means in the tenth embodiment is constructed as the observation system provided with the observation apparatus.

The schematic structure of the entire observation system of the tenth embodiment is nearly the same as that of the observation system of the second embodiment shown in FIG. 3. Hence, in the explanation of the observation system of the tenth embodiment, FIG. 3 is quoted.

In the observation system of the tenth embodiment, the observation apparatus has two interchangeable objective lenses $2_1$ and $2_2$. The interchangeable objective lenses $2_1$ and $2_2$ are constructed so that tolerances ΔFb of the distances from the mount position 5 to the back focus positions $Fb_1$ and $Fb_2$ are within ±15 mm. According to the observation system provided with the observation apparatus of the tenth embodiment thus constructed, the objective lenses of different numerical apertures and parfocal distances are used and thereby the observation application can be broadened.

Since the interchangeable objective lenses $2_1$ and $2_2$ are constructed so that tolerances ΔFb of the distances from the mount position 5 to the back focus positions $Fb_1$ and $Fb_2$ are within ±15 mm. Each of the objective lenses $2_1$ and $2_2$ can be constructed as the objective lens in which a plurality of lens units can be arranged to obtain high performance of correction for aberration.

Other structures, functions, and effects are almost the same as in the observation system provided with the observation apparatus of the ninth embodiment.

Eleventh Embodiment

The observation or measurement system provided with the observation or measurement means in the eleventh embodiment is constructed as the observation system provided with the observation apparatus.

The schematic structure of the entire observation system of the eleventh embodiment is nearly the same as that of the observation system of the third embodiment shown in FIG. 4. Hence, in the explanation of the observation system of the eleventh embodiment, FIG. 4 is quoted.

In the observation system of the eleventh embodiment, the observation apparatus is provided with two interchangeable objective lenses $2_1'$ and $2_2'$ having different parfocal distances $D_1$ and $D_2$, respectively. A spacer is provided as the mount-position adjusting means 8 changing the mount positions of the objective lenses $2_1'$ and $2_2'$ in accordance with the parfocal distances $D_1$ and $D_2$ of the objective lenses $2_1'$ and $2_2'$ so that even when either of the objective lenses $2_1'$ and $2_2'$ is interchanged, the front focus position of each objective lens interchanged and mounted practically coincides with the surface O of the object 6.

According to the observation system provided with the observation apparatus of the eleventh embodiment thus constructed, the observation application can be broadened. Since the mount-position adjusting means 8 is provided, work required to adjust focusing when the objective lenses $2_1'$ and $2_2'$ are interchanged can be eliminated.

Other structures, functions, and effects are almost the same as in the observation system provided with the observation apparatus of the ninth embodiment.

Twelfth Embodiment

The observation or measurement system provided with the observation or measurement means in the twelfth embodiment is constructed as the observation system provided with the observation apparatus. The schematic structure of the entire observation system of this embodiment is nearly the same as that of the observation system of the fourth embodiment shown in FIG. 5. Hence, in the explanation of the observation system of the twelfth embodiment, FIG. 5 is quoted.

The observation system of the twelfth embodiment is provided with a dichroic mirror or a beam splitter as the path splitting means 9 on the opposite side of the object 6 with respect to the objective lens 2 and has the imaging lenses $3_1$ and $3_2$ and the image pickup means $4_1$ and $4_2$ on individual optical paths split through the path splitting means 9. Also, in FIG. 5, reference numerals $10_1$ and $10_2$ represent spectral filters arranged on individual optical paths split through the path splitting means 9.

According to the observation system provided with the observation apparatus of the twelfth embodiment thus constructed, light of different wavelengths of a plurality of kinds can be observed simultaneously. Other structures, functions, and effects are almost the same as in the observation system provided with the observation apparatus of the ninth embodiment.

Thirteenth Embodiment

The observation or measurement system provided with the observation or measurement means in the thirteenth embodiment is constructed as the observation system provided with the observation apparatus.

The schematic structure of the entire observation system of this embodiment is nearly the same as that of the observation system of the fifth embodiment shown in FIG. 6. Hence, in the explanation of the observation system of the thirteenth embodiment, FIG. 6 is quoted.

In the observation system of the thirteenth embodiment, the observation apparatus is provided with two interchangeable imaging lenses $3_1$ and $3_2$. According to the observation system provided with the observation apparatus of the thirteenth embodiment thus constructed, for example, the numerical apertures NA' of the imaging lenses $3_1$ and $3_2$ are made different and thereby observations can be carried out at different magnifications from the object 6 to the image plane. As such, the observation application can be broadened. Other structures, functions, and effects are almost the same as in the observation system provided with the observation apparatus of the ninth embodiment.

Fourteenth Embodiment

The observation or measurement system provided with the observation or measurement means in the fourteenth embodiment is constructed as the observation system provided with the observation apparatus.

The schematic structure of the entire observation system of this embodiment is nearly the same as that of the observation system of the sixth embodiment shown in FIG. 7. Hence, in the explanation of the observation system of the fourteenth embodiment, FIG. 7 is quoted.

In the observation system of the fourteenth embodiment, the observation apparatus is provided with the illumination optical system 11 for the fluorescence observation that is movable in and out of the optical path, between the objective lens 2 and the imaging lens 3. The illumination optical system 11 for the fluorescence observation includes the LED light source 12, the illumination lens 13, the exciter filter 14, the dichroic mirror 15, and the barrier filter 16 cutting off light other than fluorescent light.

According to the observation system provided with the observation apparatus of the fourteenth embodiment constructed as mentioned above, when the fluorescence illumination optical system 11 is mounted, the fluorescence observation can be carried out. Specifically, light emitted from the LED light source 12 travels through the illumination lens 13 and light with excitation wavelength passes through the exciter filter 14 to irradiate the object 6 through the dichroic mirror 15 and the objective lens 2. Light from the object 6 travels through the objective lens 2 and light other than excitation light passes through the dichroic mirror 15, so that light other than fluorescent light is eliminated through the barrier filter 16 and only the fluorescent light is imaged by the image pickup means 4. On the other hand, when the fluorescence illumination optical system 11 is removed, the light from the object 6 can be observed like the ninth embodiment.

Also, the fluorescence illumination optical system 11 may be fixedly mounted. In this case, it is good practice that the dichroic mirror 15 and the barrier filter 16 are made movable in and out of the optical path so that, for example, when radiation is observed, the dichroic mirror 15 and the barrier filter 16 are removed. Other structures, functions, and effects are almost the same as in the observation system provided with the observation apparatus of the ninth embodiment.

Fifteenth Embodiment

The observation or measurement system provided with the observation or measurement means in the fifteenth embodiment is constructed as the observation system provided with the observation apparatus. The schematic structure of the entire observation system of this embodiment is nearly the same as that of the observation system of the seventh embodiment shown in FIG. 8. Hence, in the explanation of the observation system of the fifteenth embodiment, FIG. 8 is quoted.

In addition to the structure of the observation apparatus of any of the ninth to fourteenth embodiments mentioned above, the observation system of the fifteenth embodiment is designed so that the objective lens 2 and the imaging lens 3 satisfy the following conditions:

$$0.3 \leq NA2'/NA' \leq 0.88 \quad (5')$$

$$0.5 \leq D2/D \leq 0.87 \quad (6)$$

$$-15 < fb2 - fb < 15 \text{ (mm)} \quad (7)$$

where NA' is the numerical aperture of the imaging lens 3, D is the parfocal distance of the objective lens 2, fb is a distance, measured along the optical axis, from the surface of the object to the back focus position of the objective lens 2, NA2' is the numerical aperture of the second imaging lens $3_2$, D2 is the parfocal distance of the second objective lens $2_2$, and fb2 is a distance, measured along the optical axis, from the surface of the object to the back focus position of the second objective lens $2_2$.

The second observation apparatus is a conventional, common microscope apparatus and has the second objective lens $2_2$ and the second imaging lens $3_2$. The second image pickup optical system $1_2$ includes the second objective lens $2_2$, the second imaging lens $3_2$, and the image pickup means $4_2$. Also, in FIG. 8, reference numeral $5_2$ denotes the mount position, $6_2$ denotes the object (the living specimen), and $7_2$ denotes the image pickup information processing display means. The second objective lens $2_2$ is constructed as the infinity-corrected objective lens that is different in parfocal distance and emergence numerical aperture from the objective lens 2. The second imaging lens $3_2$ is equal in focal length to the imaging lens 3.

According to the observation system of the fifteenth embodiment, the objective lens 2 and the imaging lens 3 can be interchanged with the second objective lens $2_2$ and the second imaging lens $3_2$, respectively, provided in the second observation apparatus. Thus, according to the observation system of the fifteenth embodiment, the interchangeability with the conventional observation system can be provided and high extensiveness is obtained.

Sixteenth Embodiment

The observation or measurement system provided with the observation or measurement means in the sixteenth embodiment is constructed as the observation system provided with the observation apparatus. The schematic structure of the entire observation system of this embodiment is nearly the same as that of the observation system of the eighth embodiment shown in FIG. 9. Hence, in the explanation of the observation system of the sixteenth embodiment, FIG. 9 is quoted.

The observation system of the sixteenth embodiment includes the observation apparatus, the image pickup means 4 picking up the image of the object from this observation apparatus, and the image pickup information processing display means 7'.

In addition to nearly the same structure as the observation apparatus in the observation system of one of the ninth to twelfth embodiments, the observation apparatus has the transmission illumination optical system 21 on the opposite side of the objective lens 2, with the object 6 between them.

The transmission illumination optical system 21 has the LED light source 22 and the condenser lens 23. It is constructed so that at least one of the bright-field observation, fluorescence observation, phase-contrast observation, differential interference contrast observation, and Hoffman modulation contrast observation becomes possible. Also, in FIG. 9, reference numeral 24 designates the aperture stop and 25 designates the field stop.

In FIG. 9, the exciter filter 26 transmitting only a predetermined excitation wavelength and blocking other wavelengths is interposed between the LED light source 22 and the condenser lens 23, and the barrier filter 27 transmitting only a predetermined fluorescence wavelength and radiation wavelength and blocking other wavelengths is interposed between the objective lens 2 and the imaging lens 3, so that the fluorescence observation can be made by transmission illumination. The filters 26 and 27 are provided to be movable in and out of the optical path so that they are arranged on the optical path in the fluorescence observation and are removed therefrom in observations other than the fluorescence observation.

The aperture stop 24 is located at about the pupil position of the condenser lens 13 so that it is movable in and out of the optical path through a slider 30. In addition to the aperture stop 24, the slider 30 includes the ring slit 28 for the phase-contrast observation, the prism 29 for the differential interference contrast observation, and the polarizing plate and the slit aperture plate for the Hoffman modulation contrast observation (both not shown).

The observation system of the sixteenth embodiment is constructed so that at least one of various optical elements capable of making the bright-field observation (with the aperture stop 24), the fluorescence observation (with the aperture stop 24), the phase-contrast observation (with the ring slit 28 for the phase-contrast observation), the differential interference contrast observation (with the prism 29 for the differential interference contrast observation), and the Hoffman modulation contrast observation (with the polarizing plate and the slit aperture plate for the Hoffman modulation contrast observation) can be switched through the slider 30 at about the pupil position of the condenser lens in accordance with the observation application.

In addition to the switching operation of the slider 30, the observation system is designed so that, in observations other than the fluorescence observation, the filters 26 and 27 are removed from the optical path. In the phase-contrast observation, the objective lens 2 is replaced with one for phase contrast. Moreover, in the Hoffman modulation contrast observation, a modulator for the Hoffman modulation contrast observation is mounted close to the objective lens 2.

Besides the function of the image pickup information processing display means 7 in the observation system of any of the ninth to sixteenth embodiments, the image pickup information processing display means 7' has the image processing means (not shown) for superimposing the transmission illumination observation image of the object obtained through the image pickup means 4 on the radiation observation image from the object. The image pickup information processing display means 7' further has a display means (not shown) for displaying the image areas superimposed through the image processing means on a display device, together with the superimposed images, for example, with its contour or a circular of rectangular line.

According to the observation system provided with the observation apparatus of the sixteenth embodiment, there is no need to interpose the illumination system between the objective lens and the imaging lens, and thus compactness of an arrangement between them can be achieved. Furthermore, the performance of correction for aberration of the imaging lens whose numerical aperture NA' is large and the image-side (image-sensor-side) telecentricity of the imaging lens are improved.

Even when the observation object is transparent, the observation technique of one of the transmission fluorescence observation, phase-contrast observation, differential interference contrast observation, oblique illumination observation, and Hoffman modulation contrast observation is combined with the radiation observation and the superimposed observation images can be obtained. Whereby, the position and shape of the observation object are specified and at the same time, the luminous image can be acquired.

The superimposed image areas can be displayed together with the superimposed images on the display device and the superimposed observation areas become clear so that the position of the radiation observation of the observation object is easily held. Other structures, functions, and effects are almost the same as in the observation system provided with the observation apparatus of any of the ninth to twelfth embodiments.

In the present invention, the observation or measurement means and the observation or measurement system provided with this means, the feeble light image pickup optical system and the microscope apparatus provided with this optical system, the microscope system provided with the microscope apparatus, and the observation apparatus and the observation system provided with this apparatus are useful for the field of medicine and biology in which it is necessary to measure very feeble light in an extremely minute area and to observe the feeble light through various observation techniques over a wide observation range.

What is claimed is:

1. Observation or measurement means comprising at least:
   an infinity-corrected objective lens; and
   an imaging lens,
   wherein the observation or measurement means satisfies the following condition:

$$4.56 \leq D \cdot NA' \leq 30 \text{ (mm)}$$

where D is a parfocal distance of the objective lens and NA' is a numerical aperture of the imaging lens.

2. Observation or measurement means comprising, at least:
   an infinity-corrected objective lens; and
   an imaging lens,
   a distance from a mount position of the objective lens to a most object-side surface of the imaging lens being variable,
   wherein the observation or measurement means satisfies the following conditions:

$$4.56 \leq D \cdot NA' \leq 30 \text{ (mm)}$$

$$0.5 FL < W < 1.2 FL \text{ (mm)}$$

where D is a parfocal distance of the objective lens, NA' is a numerical aperture of the imaging lens, W is a variable amount of the distance from the mount position of the objective lens to the most object-side surface of the imaging lens, and FL is a focal length of the imaging lens.

3. Observation or measurement means comprising, at least:
   an infinity-corrected objective lens; and
   an imaging lens,
   a distance from a mount position of the objective lens to a most object-side surface of the imaging lens being variable,
   wherein the observation or measurement means satisfies the following conditions:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

4. Observation or measurement means comprising, at least:
   an infinity-corrected objective lens; and
   an imaging lens,
   a distance from a mount position of the objective lens to a most object-side surface of the imaging lens being variable,
   wherein the observation or measurement means satisfies the following conditions, and a back focus position of the objective lens is located on an object side of the mount position of the objective lens:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

5. Observation or measurement means comprising, at least:
   an infinity-corrected objective lens; and
   an imaging lens,
   a distance from a mount position of the objective lens to a most object-side surface of the imaging lens being variable,
   wherein the observation or measurement means satisfies the following conditions, a back focus position of the objective lens is located on an object side of the mount position of the objective lens, and at least two interchangeable objective lenses including the objective lens are provided and constructed so that tolerances of the distance between the mount position and the back focus position are within ±15 mm in each of the interchangeable objective lenses:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

6. Observation or measurement means comprising, at least:
   an infinity-corrected objective lens; and
   an imaging lens,
   a distance from a mount position of the objective lens to a most object-side surface of the imaging lens being variable,
   wherein the observation or measurement means satisfies the following conditions and is provided with at least two interchangeable objective lenses of different parfocal distances, including the objective lens, and mount-position adjusting means for changing the mount position of each of the interchangeable objective lenses in accordance with a parfocal distance of each objective lens so that even when either objective lens of different par-focal distance is interchanged, a front focus position of the objective lens interchanged and mounted practically coincides with the front focus position of the other objective lens:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

7. Observation or measurement means comprising, at least:
   an infinity-corrected objective lens; and
   an imaging lens,
   a distance from a mount position of the objective lens to a most object-side surface of the imaging lens being variable,
   wherein the observation or measurement means satisfies the following conditions and further comprises at least two imaging lenses including the imaging lens:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

8. Observation or measurement means comprising, at least:
an infinity-corrected objective lens; and
an imaging lens,
a distance from a mount position of the objective lens to a most object-side surface of the imaging lens being variable,
wherein the observation or measurement means satisfies the following conditions and further comprises an illumination optical system for fluorescence observations interposed between the objective lens and the imaging lens:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

9. Observation or measurement means comprising, at least:
an infinity-corrected objective lens; and
an imaging lens,
a distance from a mount position of the objective lens to a most object-side surface of the imaging lens being variable,
wherein the observation or measurement means satisfies the following conditions, a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and an illumination optical system for fluorescence observations is interposed between the objective lens and the imaging lens:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

10. Observation or measurement means comprising, at least:
an infinity-corrected objective lens; and
an imaging lens,
a distance from a mount position of the objective lens to a most object-side surface of the imaging lens being variable,
wherein the observation or measurement means satisfies the following conditions, a back focus position of the objective lens is located on an object side of the mount position of the objective lens, and the objective lens is a liquid immersion objective lens or a solid immersion objective lens:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

11. Observation or measurement means comprising, at least:
an infinity-corrected objective lens; and
an imaging lens,
a distance from a mount position of the objective lens to a most object-side surface of the imaging lens being variable,
wherein the observation or measurement means satisfies the following conditions, a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and each of the objective lenses is a liquid immersion objective lens or a solid immersion objective lens:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

12. An observation or measurement system comprising:
observation or measurement means according to any one of claims 1-11; and
image pickup means picking up an image of an object from the observation or measurement means.

13. An observation or measurement system comprising:
observation or measurement means according to any one of claims 1-1; and
image pickup means picking up an image of an object from the observation or measurement means,
wherein when the observation or measurement means according to any one of claims 1-11 is taken as first observation or measurement means and observation or measurement means having a second infinity-corrected objective lens of different parfocal distance and emergence numerical aperture from an objective lens used in the first observation or measurement means and a second imaging lens identical in focal length with an imaging lens used in the first observation or measurement means is taken as a second observation or measurement means, the objective lens and the imaging lens in the first observation or measurement means satisfy the following conditions with respect to the second objective lens and the second imaging lens in the second observation or measurement means:

$0.1 \leq NA2'/NA' \leq 0.88$ $0.5 \leq D2/D \leq 0.87$ $-15 < fb2 - fb < 15$ (mm)

where NA' is a numerical aperture of the imaging lens in the first observation or measurement means, D is a parfocal distance of the objective lens, fb is a distance, measured along an optical axis, from a surface of the object to a back focus position of the objective lens, NA2' is a numerical aperture of the second imaging lens in the second observation or measurement means, D2 is a parfocal distance of the second objective lens, and fb2 is a distance, measured along the optical axis, from the surface of the object to a back focus position of the second objective lens.

14. Observation or measurement means comprising, at least:
   an infinity-corrected objective lens; and
   an imaging lens,
   a distance from a mount position of the objective lens to a most object-side surface of the imaging lens being variable,
   wherein the observation or measurement means satisfies the following conditions, and a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

15. Observation or measurement means comprising, at least:
   an infinity-corrected objective lens; and
   an imaging lens,
   a distance from a mount position of the objective lens to a most object-side surface of the imaging lens being variable,
   wherein the observation or measurement means satisfies the following conditions, a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

16. Observation or measurement means comprising, at least:
   an infinity-corrected objective lens; and
   an imaging lens,
   a distance from a mount position of the objective lens to a most object-side surface of the imaging lens being variable,
   wherein the observation or measurement means satisfies the following conditions, and a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

17. Observation or measurement means comprising, at least:
   an infinity-corrected objective lens; and
   an imaging lens,
   a distance from a mount position of the objective lens to a most object-side surface of the imaging lens being variable, wherein the observation or measurement means satisfies the following conditions, a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens:

$4.56 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

18. An observation or measurement system comprising:
observation or measurement means according to any one of claims 14-17;
image pickup means picking up an image of an object from the observation or measurement means; and
image processing means for superimposing a transmission illumination observation image of the object obtained through the image pickup means on a radiation observation image from the object.

19. An observation or measurement system comprising:
observation or measurement means according to any one of claims 14-17;
image pickup means picking up an image of an object from the observation or measurement means;
image processing means for superimposing a transmission illumination observation image of the object obtained through the image pickup means on a radiation observation image from the object; and
display means for displaying image areas superimposed through the image processing means on a display device, together with the superimposed images.

20. A feeble light image pickup optical system comprising:
an infinity-corrected objective lens;
an imaging lens; and
an image pickup means,
wherein feeble light from an object is detectable and the feeble light image pickup optical system satisfies the following condition:

$5 \leq D \cdot NA' \leq 30$ (mm)

where D is a parfocal distance of the objective lens and NA' is a numerical aperture of the imaging lens.

21. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions:

$5 \leq D \cdot NA' \leq 30$ (mm)

$0.5FL < W < 1.2FL$ (mm)

where D is a parfocal distance of the objective lens, NA' is a numerical aperture of the imaging lens, W is a variable amount of the distance from the mount position of the objective lens to the most object-side surface of the imaging lens, and FL is a focal length of the imaging lens.

22. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and $\phi d$ is an outside diameter of a connection at a mount of the objective lens.

23. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a back focus position of the objective lens is located on an object side of a mount position of the objective lens:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and $\phi d$ is an outside diameter of a connection at a mount of the objective lens.

24. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a back focus position of the objective lens is located on an object side of a mount position of the objective lens and at least two interchangeable objective lenses including the objective lens are provided and constructed so that tolerances of the distance between the mount position and the back focus position are within ±15 mm in each of the inter-changeable objective lenses:

$$5 \leq D \cdot NA' \leq 30 \text{ (mm)}$$

$$0.5FL < W < 1.2FL \text{ (mm)}$$

$$0.4 < D/FL < 5$$

$$1 \leq D/\phi d < 3$$

where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

25. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein the feeble light image pickup optical system has at least two interchangeable objective lenses including the objective lens, provided so that their parfocal distances are different and a mount-position adjusting means for changing the mount position of each of the inter-changeable objective lenses in accordance with the parfocal distance of each objective lens so that even when either objective lens of different parfocal distance is interchanged, a front focus position of the objective lens interchanged and mounted practically coincides with the front focus position of the other objective lens:

$$5 \leq D \cdot NA' \leq 30 \text{ (mm)}$$

$$0.5FL < W < 1.2FL \text{ (mm)}$$

$$0.4 < D/FL < 5$$

$$1 \leq D/\phi d < 3$$

where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

26. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions and further comprises at least two imaging lenses including the imaging lens:

$$5 \leq D \cdot NA' \leq 30 \text{ (mm)}$$

$$0.5FL < W < 1.2FL \text{ (mm)}$$

$$0.4 < D/FL < 5$$

$$1 \leq D/\phi d < 3$$

where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

27. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions and further comprises an illumination optical system for fluorescence observations interposed between the objective lens and the imaging lens:

$$5 \leq D \cdot NA' \leq 30 \text{ (mm)}$$

$$0.5FL < W < 1.2FL \text{ (mm)}$$

$$0.4 < D/FL < 5$$

$$1 \leq D/\phi d < 3$$

where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

28. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and an illumination optical system for fluorescence observations is interposed between the objective lens and the imaging lens:

$$5 \leq D \cdot NA' \leq 30 \text{ (mm)}$$

$$0.5FL < W < 1.2FL \text{ (mm)}$$

$$0.4 < D/FL < 5$$

$$1 \leq D/\phi d < 3$$

where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

29. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a back focus position of the objective lens is located on an object side of the mount position of the objective lens and the objective lens is a liquid immersion objective lens or a solid immersion objective lens:

$5 \leq D \cdot NA' \leq 30$ (mm)

$0.5 FL < W < 1.2 FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

30. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and each of the objective lenses is a liquid immersion objective lens or a solid immersion objective lens:

$5 \leq D \cdot NA' \leq 30$ (mm)

$0.5 FL < W < 1.2 FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

31. A microscope apparatus comprising a feeble light image pickup optical system according to any one of claim 20-30.

32. A microscope system comprising:
a first microscope apparatus comprising a feeble light image pickup optical system according to any one of claim 20-30; and
a second microscope apparatus comprising a second infinity-corrected objective lens of different parfocal distance and emergence numerical aperture from the objective lens used in the first microscope apparatus and a second imaging lens identical in focal length with the imaging lens used in the first microscope apparatus,
wherein the objective lens and the imaging lens in the first microscope apparatus satisfy the following conditions with respect to the second objective lens and the second imaging lens in the second microscope apparatus:

$0.1 \leq NA2'/NA' \leq 0.88$ $0.5 \leq D2/D \leq 0.87$ $-15 < fb2 - fb < 15$ (mm)

where NA' is a numerical aperture of the imaging lens in the first microscope apparatus, D is a parfocal distance of the objective lens, fb is a distance, measured along an optical axis, from a surface of the object to a back focus position of the objective lens, NA2' is a numerical aperture of the second imaging lens in the second microscope apparatus, D2 is a parfocal distance of the second objective lens, and fb2 is a distance, measured along the optical axis, from the surface of the object to the back focus position of the second objective lens.

33. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system:

$5 \leq D \cdot NA' \leq 30$ (mm)

$0.5 FL < W < 1.2 FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

34. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and $\phi d$ is an outside diameter of a connection at a mount of the objective lens.

35. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and $\phi d$ is an outside diameter of a connection at a mount of the objective lens.

36. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and $\phi d$ is an outside diameter of a connection at a mount of the objective lens.

37. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and image processing means for superimposing a transmission illumination observation image of the object obtained through the image pickup means on a radiation observation image from the object is provided:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

38. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and image processing means for superimposing a transmission illumination observation image of the object obtained through the image pickup means on a radiation observation image from the object is provided:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

39. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens, and image processing means for superimposing a transmission illumination observation image of the object obtained through the image pickup means on a radiation observation image from the object is provided:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

40. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens, and image processing means for superimposing a transmission illumination observation image of the object obtained through the image pickup means on a radiation observation image from the object is provided:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

41. A feeble light image pickup optical system comprising:
an infinity-corrected objective lens;
an imaging lens; and
an image pickup means,
wherein feeble light from an object is detectable, a distance from a mount position of the objective lens to a most object-side surface of the imaging lens is variable, and the feeble light image pickup optical system satisfies the following conditions, and wherein a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, image processing means for super-imposing a transmission illumination observation image of the object obtained through the image pickup means on a radiation observation image from the object is provided, and display means for displaying image areas superimposed through the image processing means on a display device, together with the superimposed images, is further provided:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

42. A feeble light image pickup optical system comprising:
an infinity-corrected objective lens;
an imaging lens; and
an image pickup means,
feeble light from an object being detectable,
wherein a distance from a mount position of the objective lens to a most object-side surface of the imaging lens is variable and the feeble light image pickup optical system satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, image processing means for superimposing a transmission illumination observation image of the object obtained through the image pickup means on a radiation observation image from the object is provided, and display means for displaying image areas superimposed through the image processing means on a display device, together with the superimposed images, is further provided:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

43. A feeble light image pickup optical system comprising:
an infinity-corrected objective lens;
an imaging lens; and
an image pickup means,
feeble light from an object being detectable,
wherein a distance from a mount position of the objective lens to a most object-side surface of the imaging lens is variable and the feeble light image pickup optical system satisfies the following conditions, and wherein a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens, image processing means for superimposing a transmission illumination observation image of the object obtained through the image pickup means on a radiation observation image from the object is provided, and display means for displaying image areas superimposed through the image processing means on a display device, together with the superimposed images, is further provided:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

44. A feeble light image pickup optical system comprising:
an infinity-corrected objective lens;
an imaging lens; and
an image pickup means,
feeble light from an object being detectable,
wherein a distance from a mount position of the objective lens to a most object-side surface of the imaging lens is variable and the feeble light image pickup optical system satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens, image processing means for superimposing a transmission illumination observation image of the object obtained through the image pickup means on a radiation observation image from the object is provided, and display means for displaying image areas superimposed through the image processing means on a display device, together with the superimposed images, is further provided:

$5 \leq D \cdot NA' \leq 30$ (mm)

$0.5FL < W < 1.2FL$ (mm)

$0.4 < D/FL < 5$ $1 \leq D/\phi d < 3$ where D is a parfocal distance of the objective lens, NA' is a numerical aperture of the imaging lens, W is a variable amount of the distance from a mount position of the objective lens to a most object-side surface of the imaging lens, FL is a focal length of the imaging lens, and φd is an outside diameter of a connection at a mount of the objective lens.

45. An observation apparatus comprising:
an infinity-corrected objective lens; and
an imaging lens,
wherein the observation apparatus satisfies the following condition:

$4.56 \leq D \cdot NA' \leq 30$ (mm)

where D is a parfocal distance of the objective lens and NA' is a numerical aperture of the imaging lens.

46. An observation apparatus comprising:
an infinity-corrected objective lens; and
an imaging lens,
wherein a distance from a mount position of the objective lens to a most object-side surface of the imaging lens is variable and the observation apparatus satisfies the following conditions:

$4.56 \leq D \cdot NA' < 10$ (mm)

$0.5FL < W < 1.2FL$ (mm)

where D is a parfocal distance of the objective lens, NA' is a numerical aperture of the imaging lens, W is a variable amount of the distance from the mount position of the objective lens to the most object-side surface of the imaging lens, and FL is a focal length of the imaging lens.

47. An observation apparatus comprising:
an infinity-corrected objective lens; and
an imaging lens,
wherein a distance from a mount position of the objective lens to a most object-side surface of the imaging lens is variable and the observation apparatus satisfies the following conditions:

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

48. An observation apparatus comprising:
an infinity-corrected objective lens; and
an imaging lens,
wherein a distance from a mount position of the objective lens to a most object-side surface of the imaging lens is variable and the observation apparatus satisfies the following conditions, and wherein a back focus position of the objective lens is located on an object side of the mount position of the objective lens:

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

49. An observation apparatus comprising:
an infinity-corrected objective lens; and
an imaging lens,
wherein a distance from a mount position of the objective lens to a most object-side surface of the imaging lens is variable and the observation apparatus satisfies the following conditions, and wherein a back focus position of the objective lens is located on an object side of the mount position of the objective lens and at least two interchangeable objective lenses including the objective lens are provided and constructed so that tolerances of the distance between the mount position and the back focus position are within ±15 mm in each of the interchangeable objective lenses:

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

50. An observation apparatus comprising:
an infinity-corrected objective lens; and
an imaging lens,
wherein a distance from a mount position of the objective lens to a most object-side surface of the imaging lens is variable and the observation apparatus satisfies the following conditions and is provided with at least two interchangeable objective lenses of different parfocal distances, including the objective lens, and mount-position adjusting means for changing the mount position of each of the interchangeable objective lenses in accordance with a parfocal distance of each objective lens so that even when either objective lens of different parfocal distance is interchanged, a front focus position of the objective lens interchanged and mounted practically coincides with the front focus position of the other objective lens:

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

51. An observation apparatus comprising:
an infinity-corrected objective lens; and
an imaging lens,
wherein a distance from a mount position of the objective lens to a most object-side surface of the imaging lens is variable and the observation apparatus satisfies the following conditions and further comprises at least two imaging lenses including the imaging lens:

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

52. An observation apparatus comprising:
an infinity-corrected objective lens; and
an imaging lens,
wherein a distance from a mount position of the objective lens to a most object-side surface of the imaging lens is variable and the observation apparatus satisfies the following conditions and further comprises an illumination optical system for fluorescence observations interposed between the objective lens and the imaging lens:

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

53. An observation apparatus comprising:
an infinity-corrected objective lens; and
an imaging lens,
wherein a distance from a mount position of the objective lens to a most object-side surface of the imaging lens is variable and the observation apparatus satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and an illumination optical system for fluorescence observations is interposed between the objective lens and the imaging lens:

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

54. An observation apparatus comprising:
an infinity-corrected objective lens; and
an imaging lens,
wherein a distance from a mount position of the objective lens to a most object-side surface of the imaging lens is variable and the observation apparatus satisfies the following conditions, and wherein a back focus position of the objective lens is located on an object side of the mount position of the objective lens, and the objective lens is a liquid immersion objective lens or a solid immersion objective lens:

$4.56 \leq D \cdot NA' < 10$ (mm)

$0.5 FL < W < 1.2 FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

55. An observation apparatus comprising:
an infinity-corrected objective lens; and
an imaging lens,
wherein a distance from a mount position of the objective lens to a most object-side surface of the imaging lens is variable and the observation apparatus satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and each of the objective lenses is a liquid immersion objective lens or a solid immersion objective lens:

$4.56 \leq D \cdot NA' < 10$ (mm)

$0.5 FL < W < 1.2 FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

56. An observation system comprising:
an observation apparatus according to any one of claims 45-55; and
image pickup means picking up an image of an object from the observation apparatus.

57. An observation system comprising:
an observation apparatus according to any one of claims 45-55; and
image pickup means picking up an image of an object from the observation apparatus,
wherein when an observation apparatus according to any one of claims 45-55 is taken as a first observation apparatus and an observation apparatus having a second infinity-corrected objective lens of different parfocal distance and emergence numerical aperture from the objective lens used in the first observation apparatus and a second imaging lens identical in focal length with the imaging lens used in the first observation apparatus is taken as a second observation apparatus, the objective lens and the imaging lens in the first observation apparatus satisfy the following conditions with respect to the second objective lens and the second imaging lens in the second observation apparatus:

$0.3 \leq NA2'/NA' \leq 0.88$ $0.5 \leq D2/D \leq 0.87$ $-15 < fb2 - fb < 15$ (mm)

where NA' is a numerical aperture of the imaging lens in the first observation apparatus, D is a parfocal distance of the objective lens, fb is a distance, measured along an optical axis, from a surface of the object to a back focus position of the objective lens, NA2' is a numerical aperture of the second imaging lens in the second observation apparatus, D2 is a parfocal distance of the second objective lens, and fb2 is a distance, measured along the optical axis, from the surface of the object to the back focus position of the second objective lens.

58. An observation apparatus comprising:
an infinity-corrected objective lens; and
an imaging lens,
wherein a distance from a mount position of the objective lens to a most object-side surface of the imaging lens is variable and the observation apparatus satisfies the following conditions, and wherein a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system;

$4.56 \leq D \cdot NA' < 10$ (mm)

$0.5 FL < W < 1.2 FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and $\phi d$ is an outside diameter of a connection at a mount of the objective lens.

59. An observation apparatus comprising:
an infinity-corrected objective lens; and
an imaging lens,
wherein a distance from a mount position of the objective lens to a most object-side surface of the imaging lens is variable and the observation apparatus satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system;

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

60. An observation apparatus comprising:
an infinity-corrected objective lens; and
an imaging lens,
wherein a distance from a mount position of the objective lens to a most object-side surface of the imaging lens is variable and the observation apparatus satisfies the following conditions, and wherein a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens:

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

61. An observation apparatus comprising:
an infinity-corrected objective lens; and
an imaging lens,
wherein a distance from a mount position of the objective lens to a most object-side surface of the imaging lens is variable and the observation apparatus satisfies the following conditions, and wherein a back focus position of the objective lens is located on an object side of the mount position of the objective lens, at least two interchangeable objective lenses including the objective lens are provided and constructed so that tolerances of the distance between the mount position and the back focus position are within ±15 mm in each of the interchangeable objective lenses, and a transmission illumination optical system constructed so that at least one of a bright-field observation, a fluorescence observation, a phase-contrast observation, a differential interference contrast observation, and a Hoffman modulation contrast observation can be made is provided on an opposite side of the objective lens, with an object between the objective lens and the transmission illumination optical system, and has a light source and a condenser lens so that at least one of various optical elements capable of making the bright-field observation, the fluorescence observation, the phase-contrast observation, the differential interference contrast observation, and the Hoffman modulation contrast observation can be switched at about a pupil position of the condenser lens:

$4.56 \leq D \cdot NA' < 10$ (mm)

$0.5FL < W < 1.2FL$ (mm)

$0.4 < D/FL < 1.2$ $1 < D/\phi d < 2.75$ where D is a parfocal distance of the objective lens, NA' is a numerical aperture of the imaging lens, W is a variable amount of the distance from the mount position of the objective lens to the most object-side surface of the imaging lens, FL is a focal length of the imaging lens, and φd is an outside diameter of a connection at a mount of the objective lens.

62. An observation system comprising:
an observation apparatus according to any one of claims 58-61;
image pickup means picking up an image of an object from the observation apparatus; and
image processing means for superimposing a transmission illumination observation image of the object obtained through the image pickup means on a radiation observation image from the object.

63. An observation system comprising:
an observation apparatus according to any one of claims 58-61;
image pickup means picking up an image of an object from the observation apparatus;
image processing means for superimposing a transmission illumination observation image of the object obtained through the image pickup means on a radiation observation image from the object; and
display means for displaying image areas superimposed through the image processing means on a display device, together with the superimposed images.

* * * * *

UNITED STATES PATENT AND TRADEMARK OFFICE
CERTIFICATE OF CORRECTION

PATENT NO. : 7,602,555 B2  Page 1 of 1
APPLICATION NO. : 11/386615
DATED : October 13, 2009
INVENTOR(S) : Kawasaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this

Fifth Day of October, 2010

David J. Kappos
*Director of the United States Patent and Trademark Office*